United States Patent
Skeffington

(10) Patent No.: US 9,521,009 B1
(45) Date of Patent: Dec. 13, 2016

(54) AUTO-CONFIGURATION AND AUTOMATION OF A BUILDING MANAGEMENT SYSTEM

(71) Applicant: Crestron Electronics, Inc., Rockleigh, NJ (US)

(72) Inventor: Michael Skeffington, Ridgewood, NJ (US)

(73) Assignee: Creston Electronics, Inc., Rockleigh, NJ (US)

(*) Notice: Subject to any disclaimer, the term of this patent is extended or adjusted under 35 U.S.C. 154(b) by 0 days.

(21) Appl. No.: 15/001,464

(22) Filed: Jan. 20, 2016

(51) Int. Cl.
| | |
|---|---|
| H05B 37/02 | (2006.01) |
| H05B 39/04 | (2006.01) |
| H05B 41/36 | (2006.01) |
| H04L 12/28 | (2006.01) |
| H04W 4/04 | (2009.01) |
| H04W 84/18 | (2009.01) |

(52) U.S. Cl.
CPC ....... *H04L 12/2827* (2013.01); *H04L 12/2807* (2013.01); *H04W 4/043* (2013.01); *H04L 2012/285* (2013.01); *H04L 2012/2841* (2013.01); *H04L 2012/2849* (2013.01); *H04W 84/18* (2013.01)

(58) Field of Classification Search
CPC ....... H04B 37/038; H04B 39/04; H04B 41/38; G05B 15/02; G05B 17/02; G05B 19/02; H04L 12/2816; H04L 2012/2841; H05B 37/0245; H05B 37/027; H05B 39/04; H05B 39/042; H05B 41/36; H05B 41/38; Y02B 20/46

USPC ................. 315/294; 455/418–420
See application file for complete search history.

(56) References Cited

U.S. PATENT DOCUMENTS

| | | | |
|---|---|---|---|
| 4,538,218 | A | 8/1985 | Watson |
| 6,823,223 | B2 | 11/2004 | Gonzales et al. |
| 6,970,751 | B2 | 11/2005 | Gonzales et al. |
| 7,099,723 | B2 | 8/2006 | Gonzales et al. |
| 8,159,156 | B2 | 4/2012 | Henig et al. |
| 8,457,793 | B2 | 6/2013 | Golding et al. |
| 8,587,225 | B2 | 11/2013 | Ashar et al. |

(Continued)

*Primary Examiner* — Simon Nguyen
(74) *Attorney, Agent, or Firm* — Creston Electronics, Inc.

(57) ABSTRACT

A building management system is disclosed that is automatically configured using a wireless mesh network data and sensor data to create a virtual floor plan. The building management system comprising a control processor, a plurality of lighting devices, and a plurality of control devices comprising lighting control devices, each directly controlling one or more of the lighting devices. The control devices intercommunicate with each other over a wireless network, and each control device comprises a light sensor detecting light intensity. The control processor creates the mesh graph of relative positioning of the control devices to each other using received wireless signal strengths of the control devices relative to each other. The control processor determines relative positioning of the lighting devices to the control devices using the mesh graph and received light intensity readings obtained by the light sensors of the control devices when each lighting device was turned on and off. The virtual floor plan comprises the relative positioning of the control devices to each other, the relative positioning of the control devices to the lighting devices, and room-by-room groupings of the plurality of control devices and the lighting devices.

32 Claims, 23 Drawing Sheets

(56) References Cited

U.S. PATENT DOCUMENTS

| | | |
|---|---|---|
| 8,909,380 B2 | 12/2014 | Golding et al. |
| 9,002,522 B2 | 4/2015 | Mohan et al. |
| 9,374,874 B1 * | 6/2016 | Ewing ................ H05B 37/0272 |
| 2009/0045939 A1 | 2/2009 | Holland et al. |
| 2011/0307112 A1 * | 12/2011 | Barrilleaux ............ H05B 37/02 700/291 |
| 2012/0235579 A1 * | 9/2012 | Chemel ................... F21S 2/005 315/152 |
| 2013/0063065 A1 * | 3/2013 | Berman .............. H04L 12/2827 318/480 |
| 2013/0088168 A1 * | 4/2013 | Mohan ................... G05B 15/02 315/297 |
| 2013/0113284 A1 * | 5/2013 | Altonen .................... H02J 3/12 307/31 |
| 2013/0322281 A1 | 12/2013 | Ludlow et al. |
| 2015/0087278 A1 | 3/2015 | Kim et al. |
| 2015/0156030 A1 * | 6/2015 | Fadell ................ H04L 12/2816 700/90 |
| 2015/0229488 A1 * | 8/2015 | Averitt ................ H04L 12/2809 455/420 |
| 2015/0342008 A1 * | 11/2015 | Bergmans .......... H05B 37/0245 315/294 |

* cited by examiner

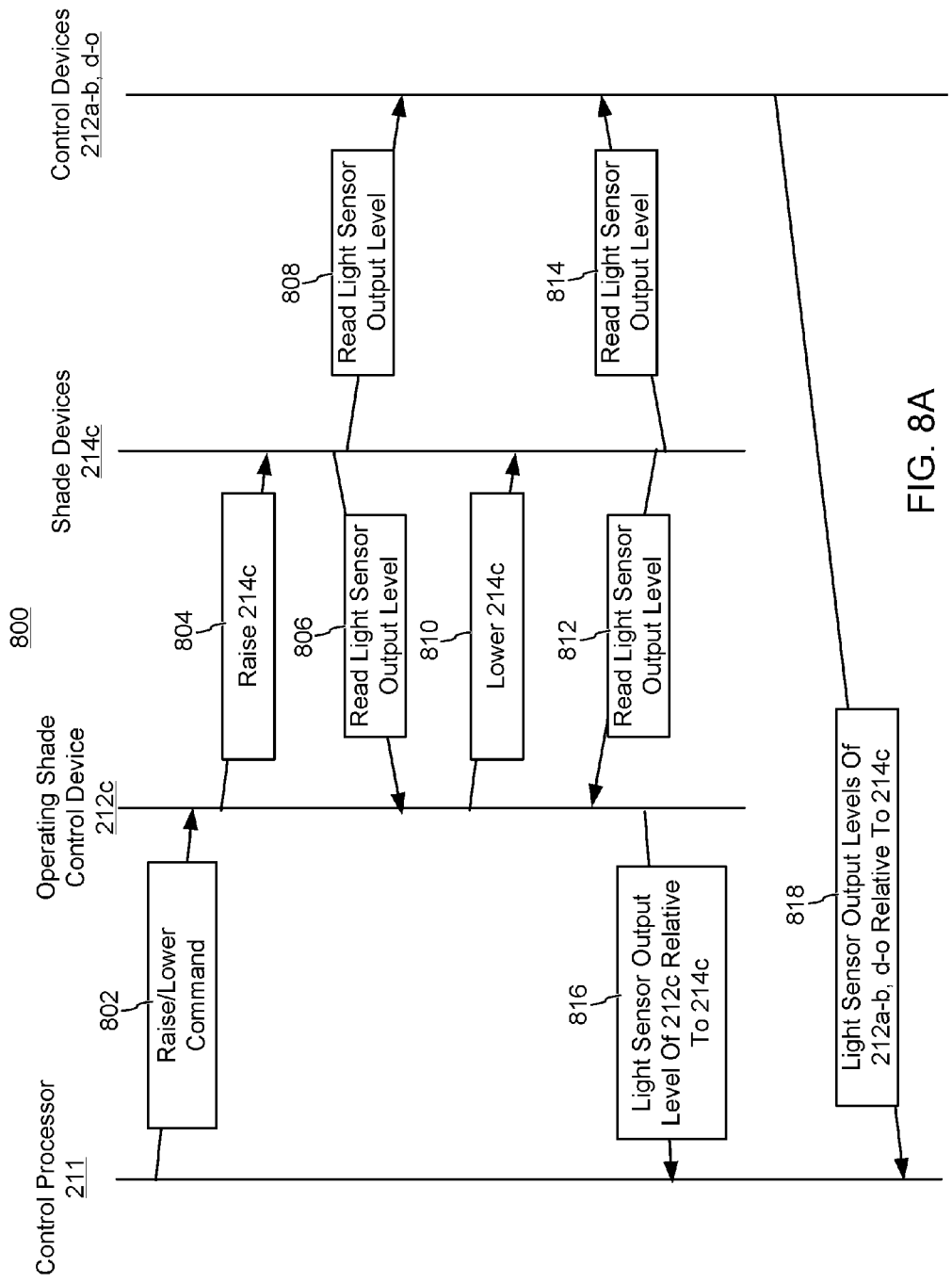

AUTO-CONFIGURATION AND AUTOMATION OF A BUILDING MANAGEMENT SYSTEM

BACKGROUND OF THE INVENTION

Technical Field

Aspects of the embodiments relate to building automation, and more specifically to systems, methods, and modes for a building management system that is automatically configured using a wireless mesh network data and sensor data to create a virtual floor plan.

Background Art

Building automation is ever evolving to provide consumers with convenient and simple control and monitoring of various mechanical and electrical equipment within a building through building management systems (BMS), also known as building automation systems (BAS), and energy management systems (EMS). Building management systems provide comfort, convenience, simplicity and security, as well as lower energy costs. They utilize a network of control devices and sensors distributed throughout a residential or commercial building to control and provide information of the mechanical and electrical equipment within the building. For example, the system can control one or more of heating, ventilation and air conditioning (HVAC), lighting, shading, security, appliances, door locks, and audiovisual (AV) equipment, among others.

Building management systems are implemented in buildings of varying degree of complexity. They are not only available today for high-end installations, but are becoming popular and more accessible to mid-range and residential installations due to decreasing costs, developments in technology, and improvements in simplicity of use. While home automation solutions are becoming increasingly available to an average consumer, they continue to suffer from many setbacks. Many home automation systems implement complicated components and software tools, requiring a trained technician to install and configure the system. Yet, home automation systems that are simple and easy to install and configure, only provide basic operations, lacking the high end features and control options available in more complex systems.

Accordingly, a need has arisen for a building management system that is automatically configured without compromising the system's level of control.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for building automation, and more specifically for a building management system that is automatically configured without compromising the system's level of control.

It is also an aspect of the embodiments to provide systems, methods, and modes for a building management system that is automatically configured using a wireless mesh network data and sensor data to create a virtual floor plan.

It is further an aspect of the embodiments to provide systems, methods, and modes for a building management system that uses a virtual floor plan for seamless and enhanced room-by-room control of the various controllable devices within the building, and to effectively monitor and report the state of the building in a user friendly manner, without manual configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a building management system that is automatically configured is provided comprising a plurality of lighting devices, a plurality of control devices, and at least one control processor. The plurality of control devices comprise lighting control devices, each lighting control device directly controlling one or more of the lighting devices. In addition, each control device comprises (i) a bidirectional wireless network interface enabling the control devices to intercommunicate with each other over a wireless network, and (ii) a light sensor detecting light intensity. The control processor is in communication with the control devices and comprises a memory encoding one or more processor-executable instructions. The processor-executable instructions, when executed by the control processor, cause acts to be performed comprising: (i) creating a mesh graph of relative positioning of the control devices to each other using received wireless signal strengths of the control devices relative to each other, (ii) determining relative positioning of the lighting devices to the control devices using the mesh graph and received light intensity readings obtained by the light sensors of the control devices when each lighting device was turned on and off, and (iii) creating a virtual floor plan comprising the relative positioning of the control devices to each other and the relative positioning of the control devices to the lighting devices. According to some aspects of the embodiments, the virtual floor plan comprises room-by-room groupings of the plurality of control devices and the lighting devices.

According to some aspects of the embodiments, the control processor sends a command to each control device requesting it to read the received wireless signal strengths of other control devices. The control processor determines distances between the control devices relative to each other using the received wireless signal strengths, and plots the determined distances on the virtual floor plan. The control processor can determine distances between the control devices and the lighting devices based on the received light intensity readings, and plots the determined distances on the virtual floor plan. The distances can be determined using an inverse square law of light formula. Furthermore, the control processor can determine at least one of the relative positioning of the control devices to each other and the relative positioning of the control devices to the lighting devices using one or more of trilateration, triangulation, fingerprinting, and any combination thereof.

According to some aspects of the embodiments, the control processor cycles through and commanding each lighting control device to perform an on/off operation on one or more lighting device it directly controls. The control processor then receives from each control device light intensity readings obtained by its light sensor during each on/off operation, and recording a data set for each control device with changed light intensity readings. In another embodiment, for each on/off operation, the control processor (i) sends an on/off command to a lighting control device that directly controls a lighting device; (ii) designates the lighting control device receiving the on/off command as an operating lighting control device; (iii) receives from each control device a pair light intensity readings comprising a first light intensity reading when the lighting device is turned on and a second light intensity reading when the lighting device is turned off; and (iv) for each pair of light intensity readings, compares the first light intensity reading to the second light intensity reading to determine whether the light intensity has changed. In response to the on/off command, the operating lighting control device: (i) turns on a lighting device it directly controls, (ii) turns off the lighting device it directly controls, (iii) reads via its light sensor light intensities when the lighting device it directly controls is turned on and when the lighting device it directly controls is turned off, and (iv) transmits the recorded light intensity readings to the control processor.

According to some aspects of the embodiments, each data set comprises: a unique identification number of the operating lighting control device, a unique identification number of a control device with changed light intensity reading, and a determined change in light intensity. In another embodiment, one of the control processor and the operating lighting control device prompts the remaining control devices to perform light sensor reading operations during each on/off operation and to report their light intensity readings to the control processor.

According to some aspects of the embodiments, the control processor identifies duplicate lighting control devices controlling same lighting device by: (i) for each on/off operation, determining whether at least two data sets were recorded, and if so, grouping the at least two data sets into a group of data sets; (ii) comparing the groups of data sets to each other to identify fully overlapping groups of data sets having identical lighting control devices with identical changed light intensity readings; and (iii) identifying and recording operating control devices of the fully overlapping groups of data sets as duplicate control devices controlling the same lighting device. According to some embodiments, data sets are discarded for light intensity readings with no perceived light intensity change or for a change in light intensity reading that falls below a predetermined threshold value.

According to some aspects of the embodiments, in creating the virtual floor plan, the control processor: (i) creates an outer boundary wall around a combination of control devices with one or more recorded data sets; and (ii) creates one or more inner walls between close control devices that have no overlapping data sets, wherein the one or more inner walls are attached to one or more of the plurality of control devices. In one embodiment, in creating the inner walls, the control processor (i) comparing the data sets to each other; and (ii) creates one or more inner walls to segregate any control device of a data set that is not found in any of a remainder of the data sets. In another embodiment, in creating the inner walls, the control processor: (i) for each on/off operation, determines whether at least two data sets were recorded, and if so, grouping the at least two data sets into a group of data sets; (ii) compares the groups of data sets to each other to (a) identify fully overlapping groups of data sets with identical control devices, and to (b) identify partially overlapping groups of data sets with partially overlapping control devices; (iii) creates one or more inner walls to segregate a combination of control devices of the fully overlapping groups of data sets from a remainder of control devices; and (iv) creates one or more partial inner walls to segregate from each other control devices that do not overlap in the partially overlapping groups of data set records. The outer boundary wall can be refined by eliminating areas of void in proximity to the outer boundary wall where no control devices or lighting devices are present.

In another embodiment, for each on/off operation, the processor determines whether at least one data set was recorded, and if no data set was recorded, the control processor creates a record of a lighting control device operating an isolated lighting device. Each isolated lighting device can be plotted on the virtual floor plan in proximity to a lighting control device that controls the isolated lighting device. A separate outer boundary wall can be created around the plotted isolated lighting device and outside of the outer boundary wall.

According to some aspects of the embodiments, the building management system further comprises a plurality of shade devices and the control devices comprise shade control devices, each directly controlling one or more of the shade devices. The one or more processor-executable instructions, when executed by the control processor, further cause acts to be performed comprising: (i) determining relative positioning of the shade device to the control devices using the mesh graph and received light intensity readings obtained by the light sensors of the control devices when each shade device was raised and lowered, and (ii) plotting the relative positioning of the shade device to the control devices onto the virtual floor plan. In addition, the control processor (i) cycles through and commands each shade control device to perform a raise/lower operation on one or more shade device it directly controls, and (ii) receives from each control device light intensity readings obtained by its light sensor during each raise/lower operation, and recording a data set for each control device with changed light intensity readings. In another embodiment, for each raise/lower operation, the control processor: (i) sends a raise/lower command to a shade control device that directly controls a shade device; (ii) designates the shade control device receiving the raise/lower command as an operating shade control device; (iii) receives from each control device a pair light intensity readings comprising a first light intensity reading when the shade device is fully raised and a second light intensity reading when the shade device is fully lowered; and (iii) for each pair of light intensity readings, comparing the first light intensity reading to the second light intensity reading to determine whether the light intensity has changed.

According to some aspects of the embodiments, the bidirectional wireless network interface can comprise a bidirectional RF or IR transceiver. Each control device transmits to the control processor configuration data comprising one or more of: a unique identification number, types of controllable devices it directly controls, number of controllable devices it directly controls, types of sensor outputs it has, type of user input it has, and any combinations thereof. Each control device can further comprise one or more of a proximity sensor, a sound sensor, a microphone, an ambient temperature sensor, or any combinations thereof.

In another embodiment, each control device can further comprise a sensor that detects a distance to an oppositely disposed wall, and wherein the processor plots the oppositely disposed wall onto the virtual floor plan based on the distance. In another embodiment, each control device can further comprise a sound sensor that detects a distance to a speaker based on a sound emitted from the speaker, and wherein the processor plots the speaker onto the virtual floor plan based on the distance. In some aspects of the embodiments, the light sensor can comprise one or more of a photosensor, a photocell, an open-loop daylight sensing photocell, a closed-loop ambient light sensing photocell, or any combination thereof. In another embodiment, each control device can further comprise an occupancy sensor that detects an occupancy state of a room. In some embodiments, the occupancy sensor comprises at least one of an infrared sensor, an ultrasonic sensor, and any combinations thereof.

According to another aspect of the embodiments, a building management system that is automatically configured is provided comprising a plurality of lighting devices, a plurality of control devices, and a control processor. The plurality of control devices comprise lighting control devices, each lighting control device directly controlling one or more of the lighting devices. Each control device further comprises: (i) a bidirectional wireless network interface enabling the control devices to intercommunicate with each other over a wireless network, and (ii) a light sensor detecting light intensity. The control processor is in communication with the control devices and comprises a memory encoding one or more processor-executable instructions. The processor-executable instructions, when executed by the control processor, cause acts to be performed comprising: (i) receiving wireless signal strengths of the control devices relative to each other, (ii) creating a mesh graph of relative positioning of the control devices to each other using the received wireless signal strengths, (iii) cycling through and commanding each lighting control device to perform an on/off operation on one or more lighting device it directly controls, (iv) receiving from each control device light intensity readings obtained by its light sensor during each on/off operation, and recording a data set for each control device with changed light intensity readings; (v) determining relative positioning of the control devices to the lighting devices using the mesh graph and the recorded data sets, and (vi) creating a virtual floor plan comprising the relative positioning of the control devices to each other and the relative positioning of the control devices to the lighting devices.

According to another aspect of the embodiments, a method is provided for automatically configuring a building management system. The building management system comprising (i) a plurality of lighting devices, and (ii) a plurality of control devices comprising lighting control devices each directly controlling one or more of the lighting device. The method comprising: (i) receiving wireless signal strengths of a plurality of control devices relative to each other obtained by bidirectional wireless network interfaces of the control devices that enable the control devices to intercommunicate with each other over a wireless network; (ii) creating a mesh graph of relative positioning of the control devices to each other using the received wireless signal strengths of the control devices relative to each other; (iii) determining relative positioning of the lighting devices to the control devices using the mesh graph and received light intensity readings obtained by light sensors of the control devices when each lighting device was turned on and off; and (iv) creating a virtual floor plan comprising the relative positioning of the control devices to each other and the relative positioning of the control devices to the lighting devices.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1A:
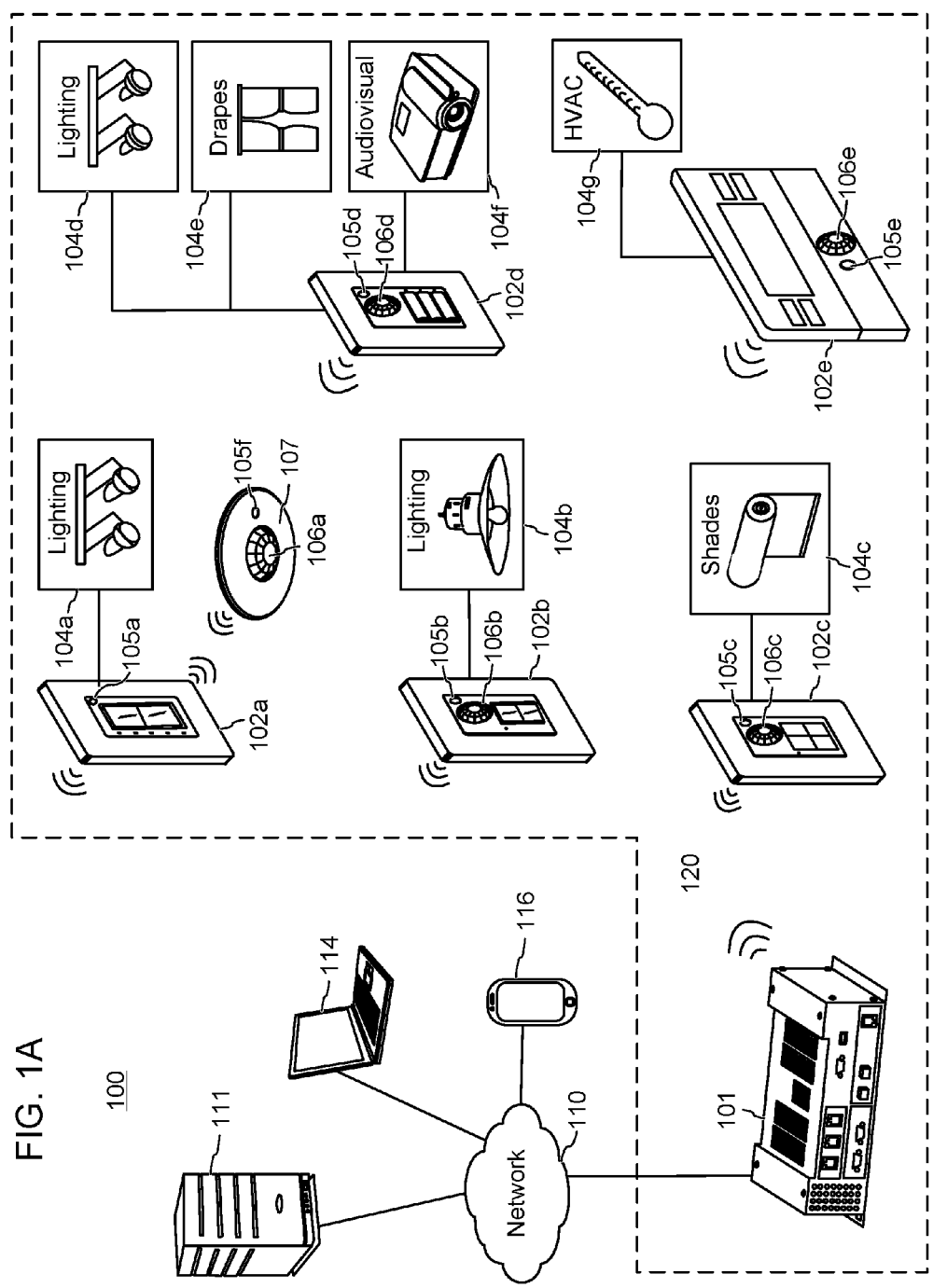
Figure 1B:
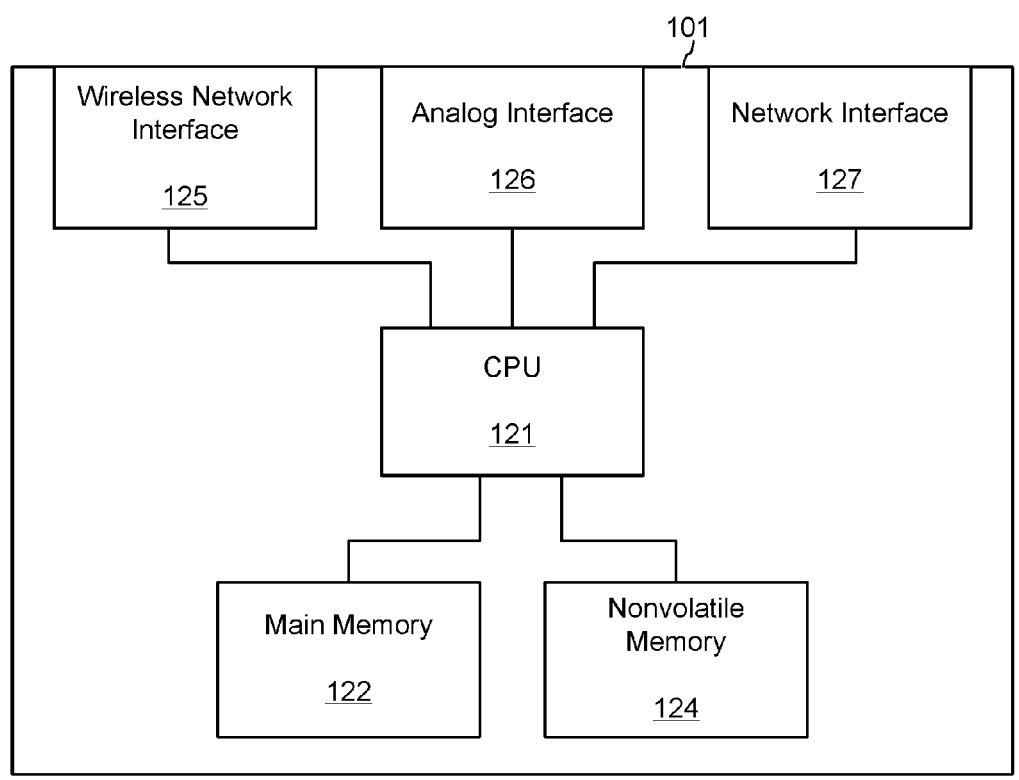
Figure 1C:
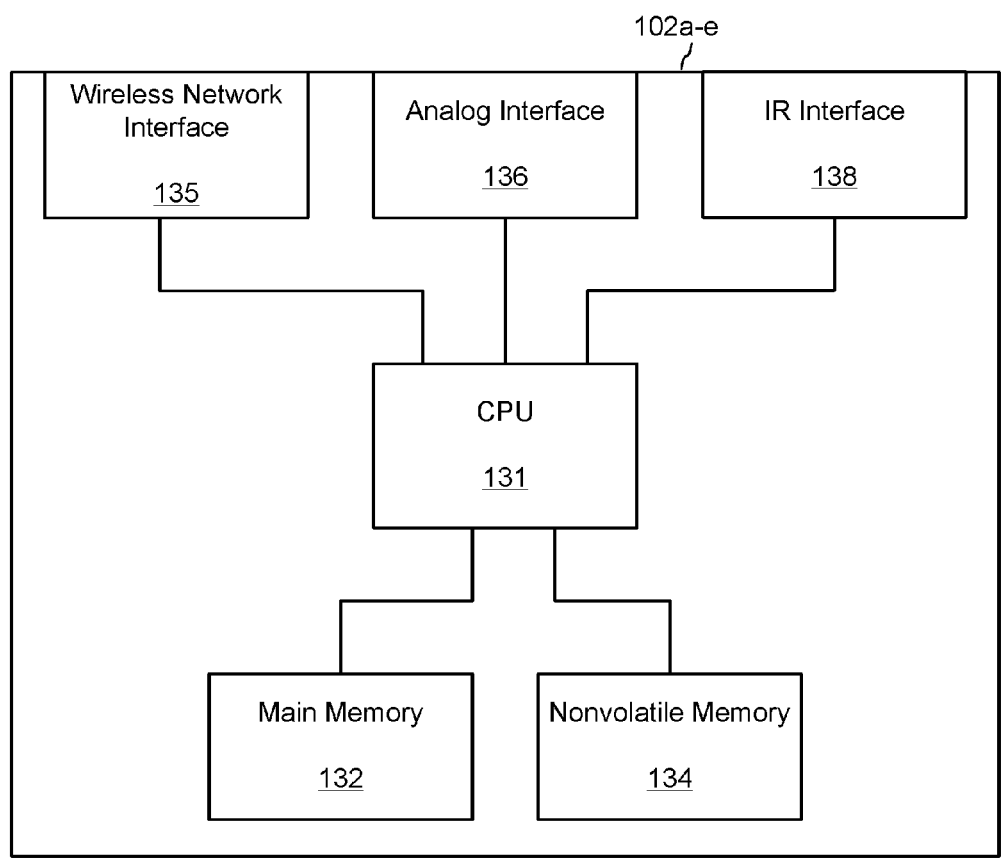
Figure 2:
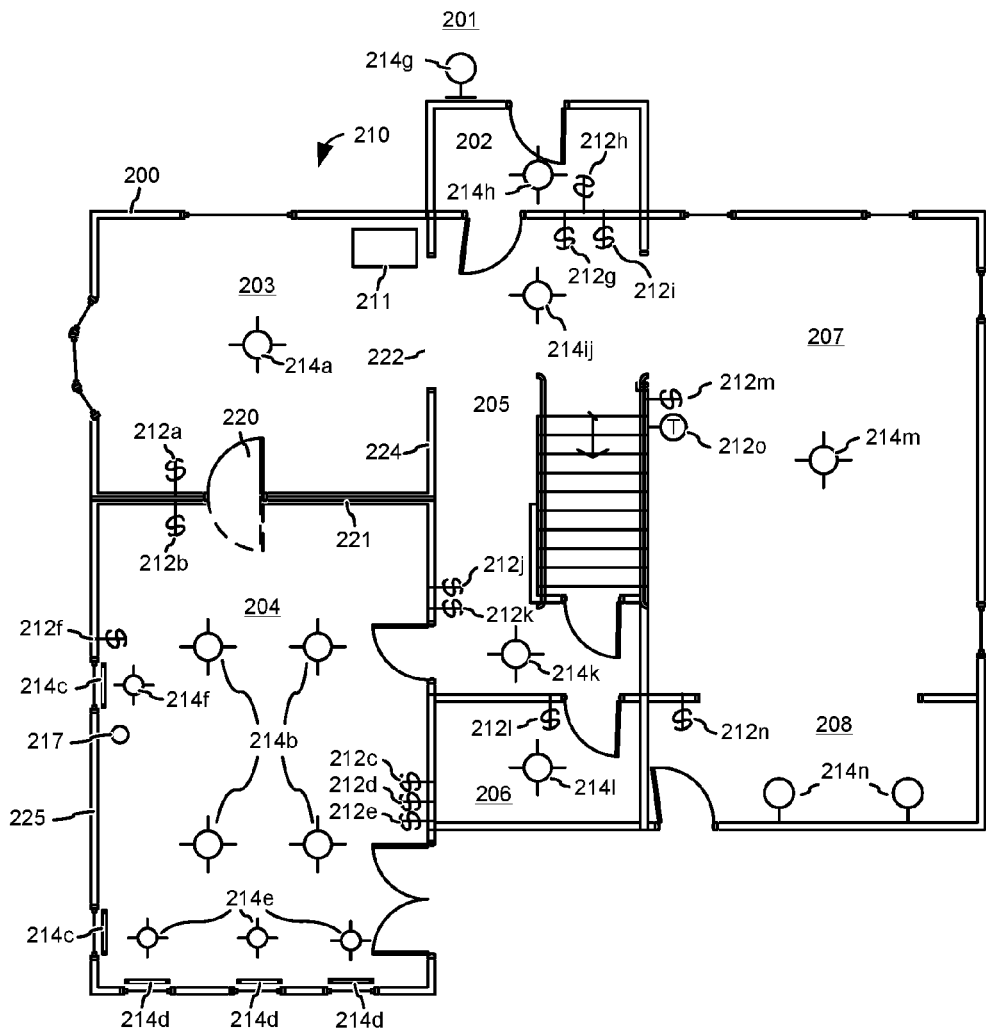
Figure 3:
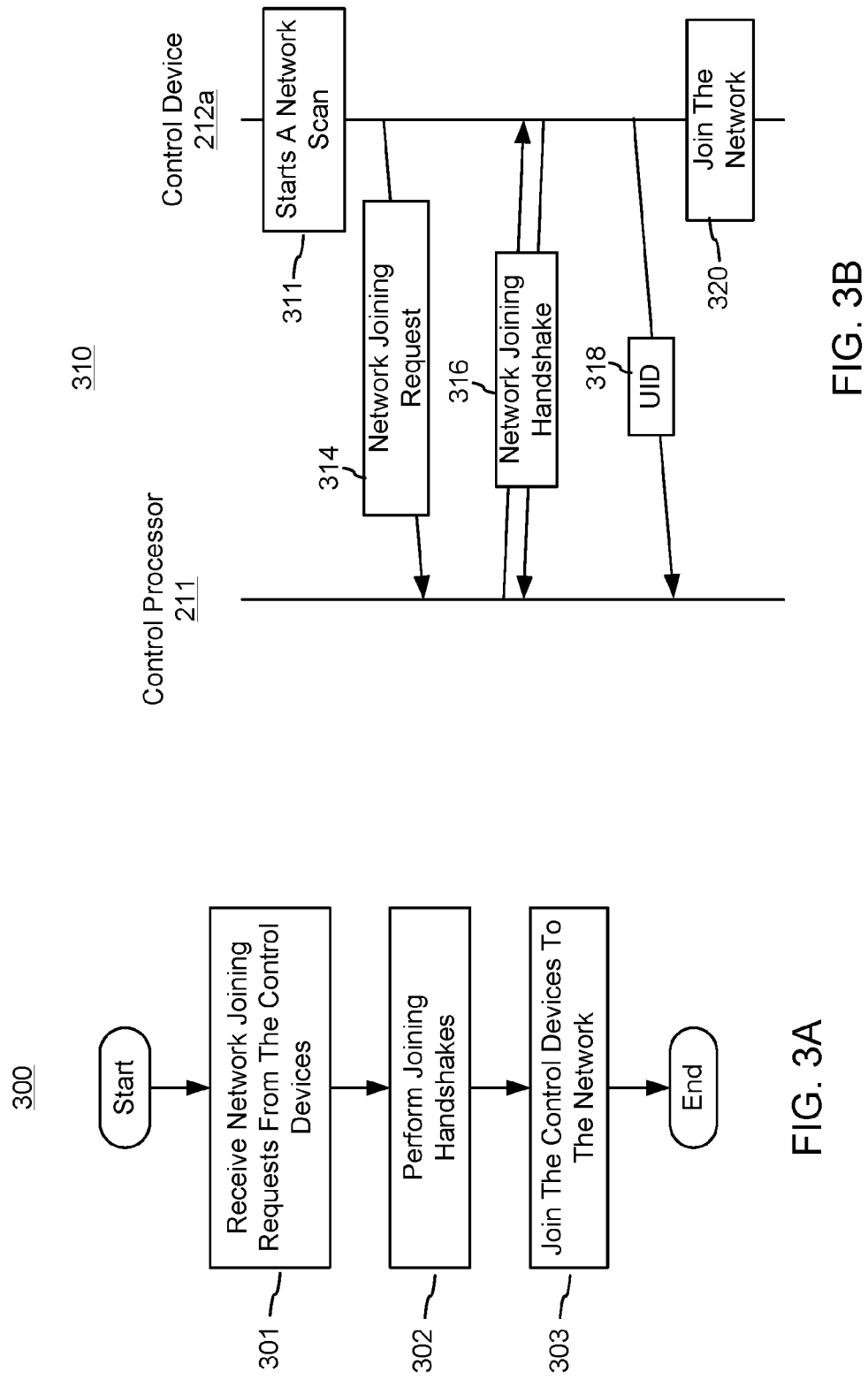
Figure 4:
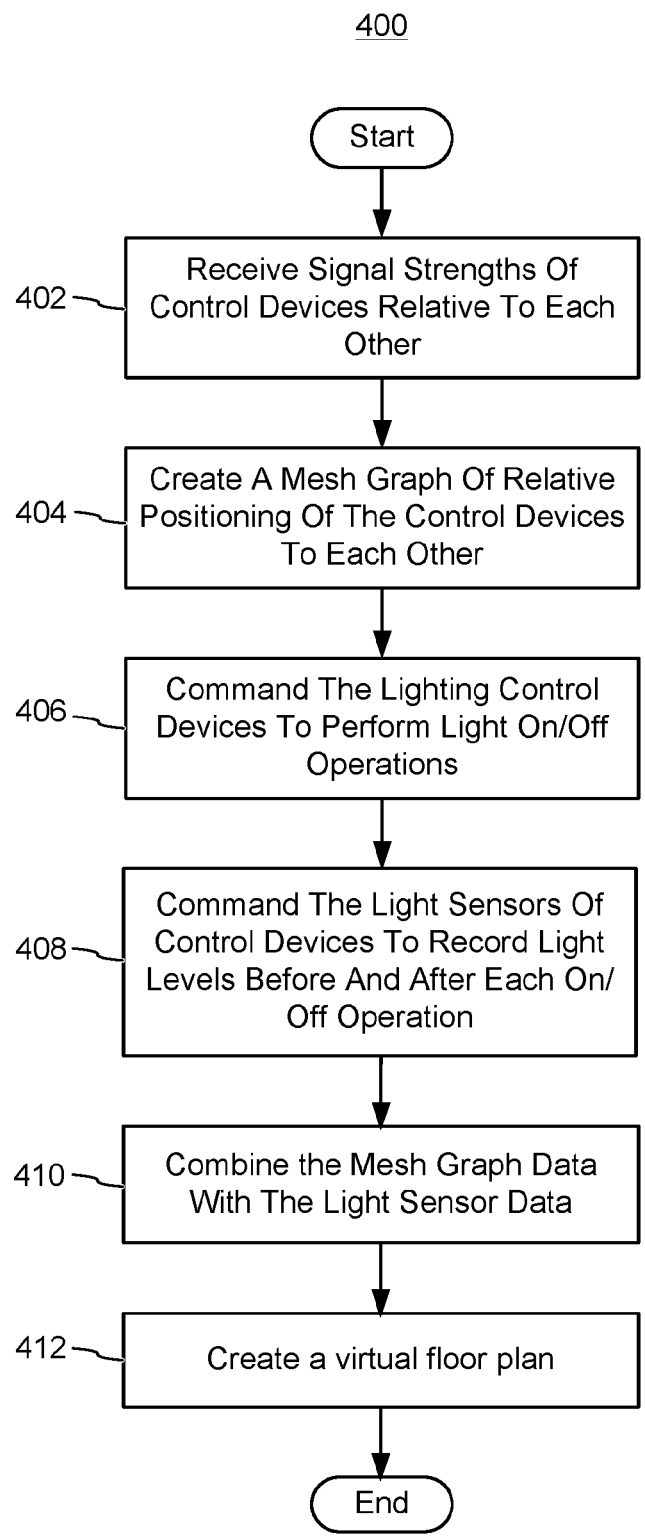
Figure 5A:
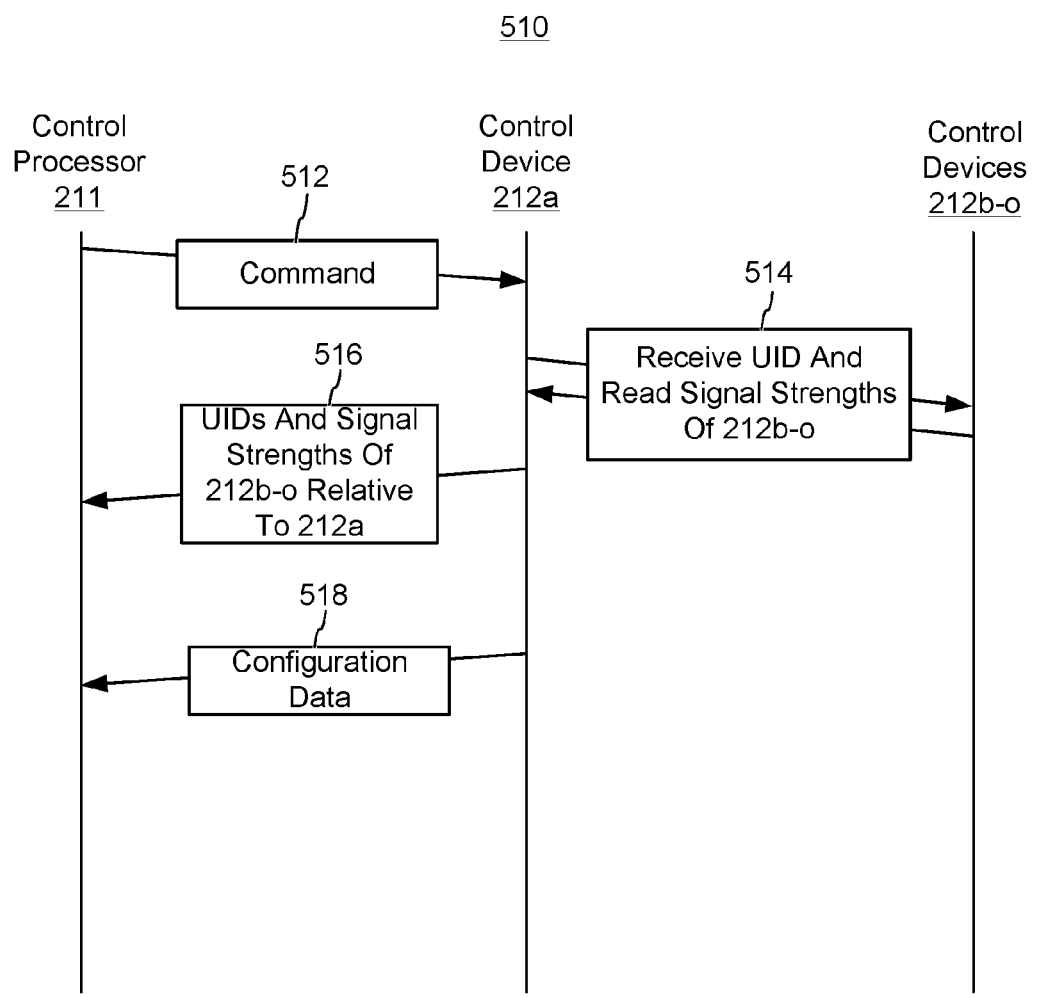
Figure 5B:
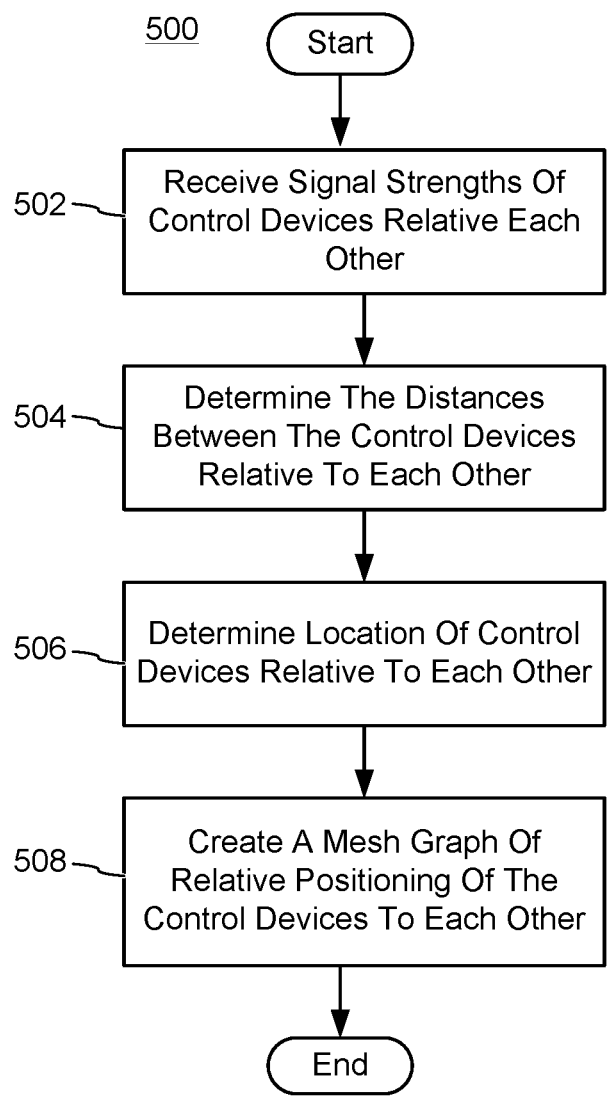
Figure 6:
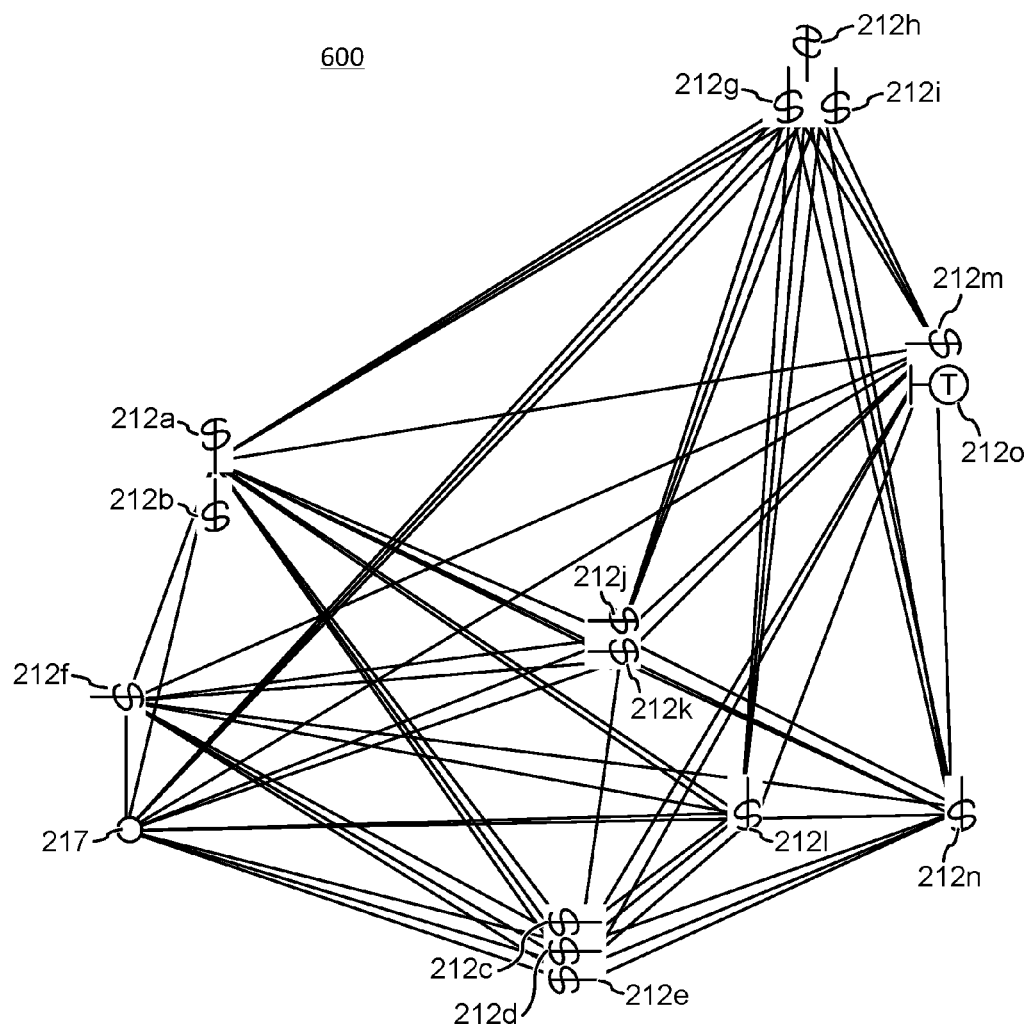
Figure 7A:
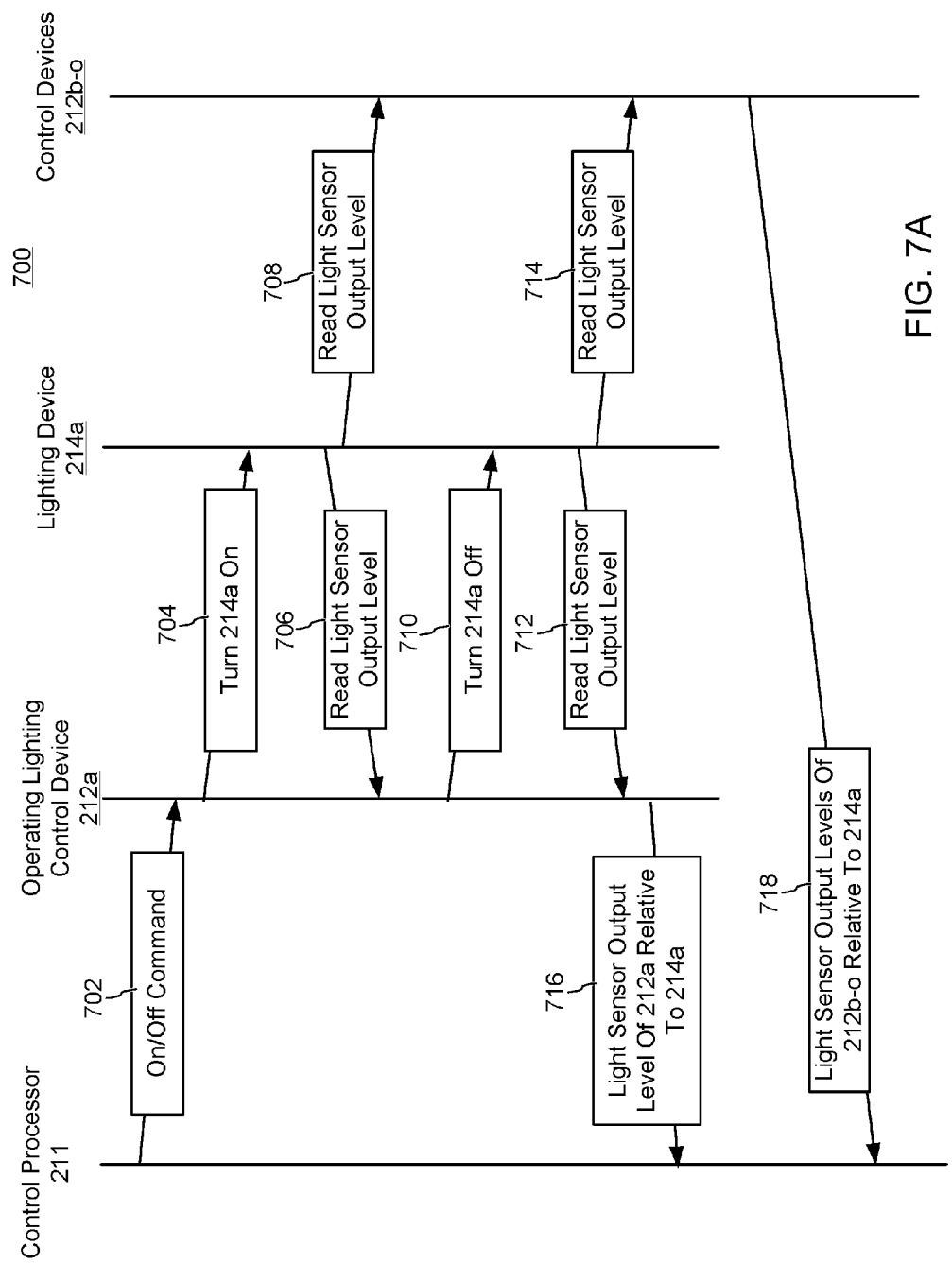
Figure 7B:
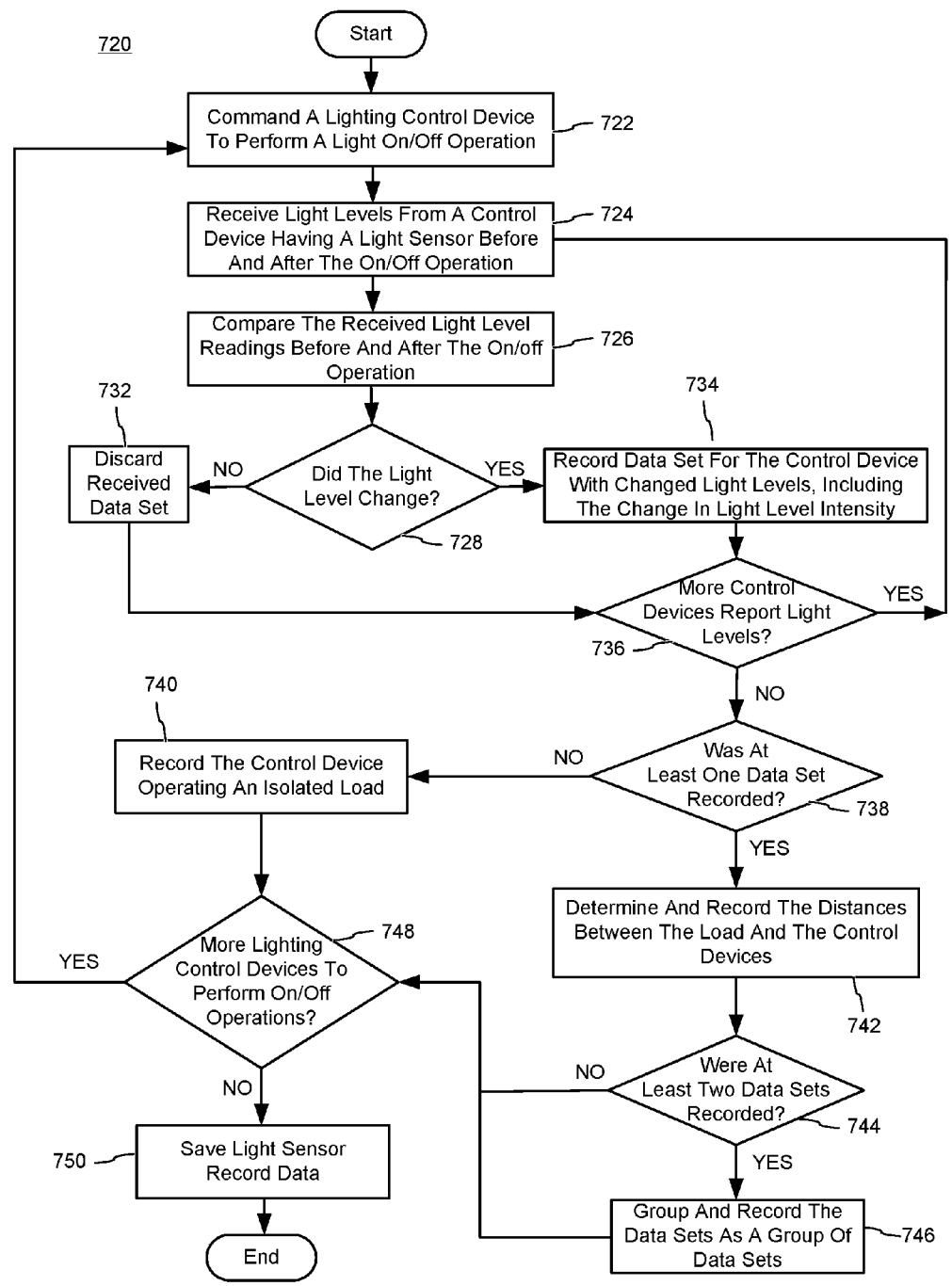
Figure 8B:
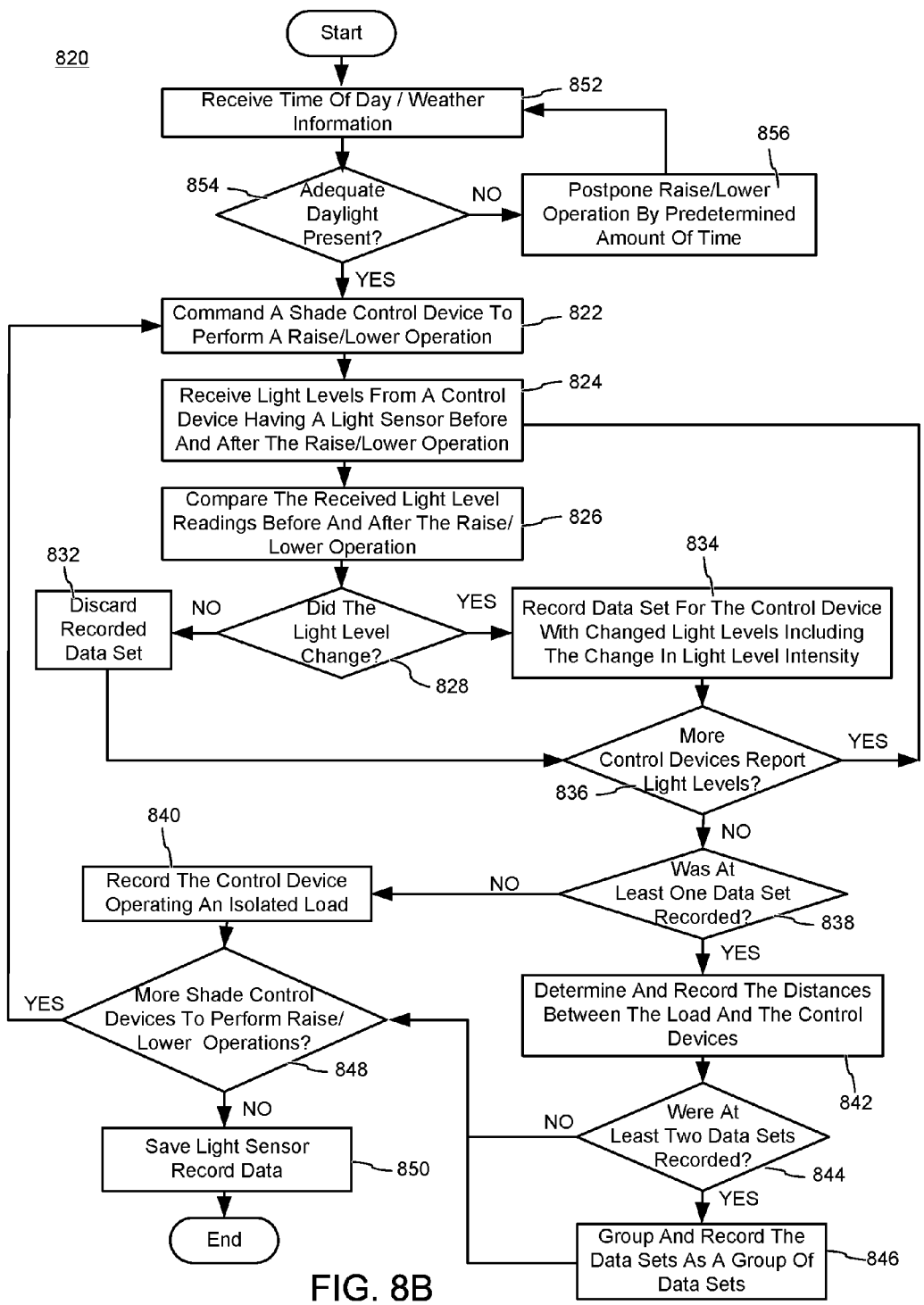
Figure 9:
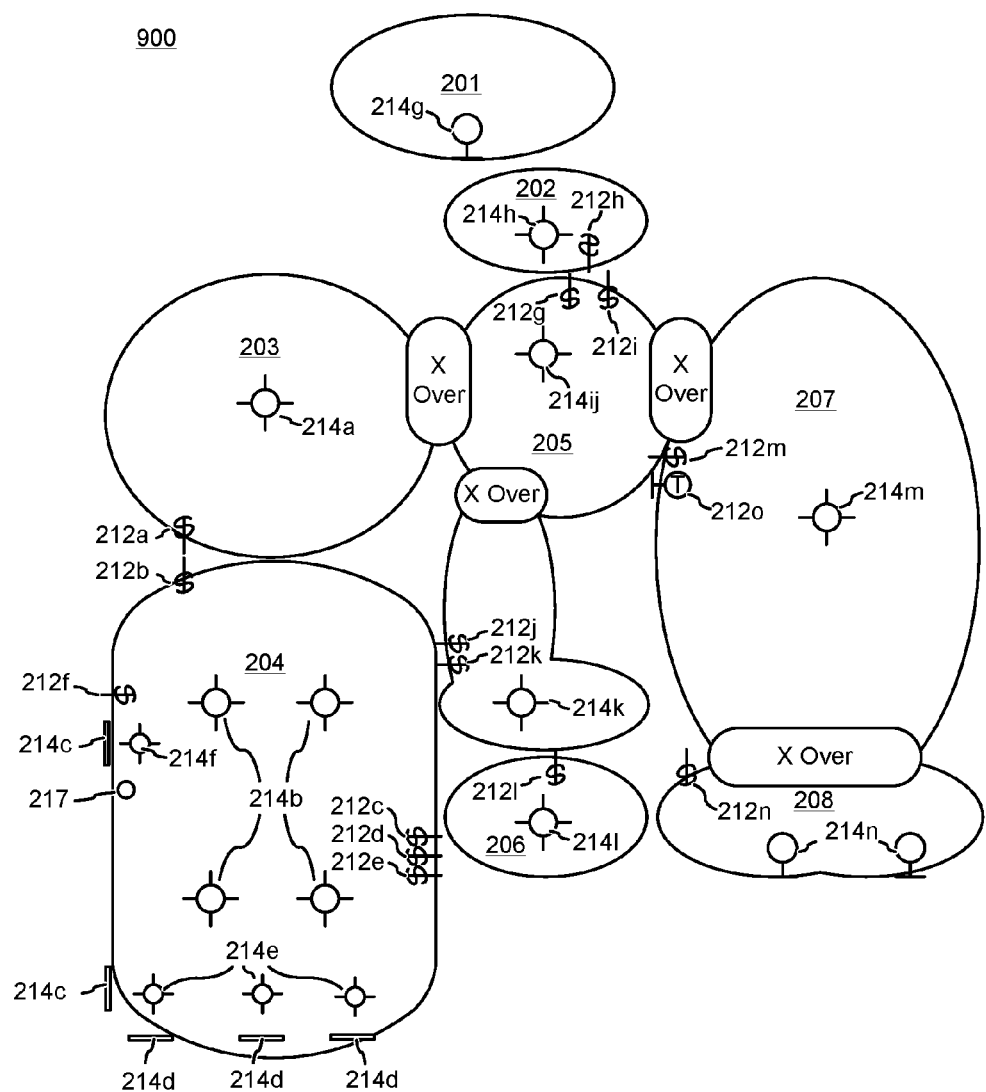
Figure 10:
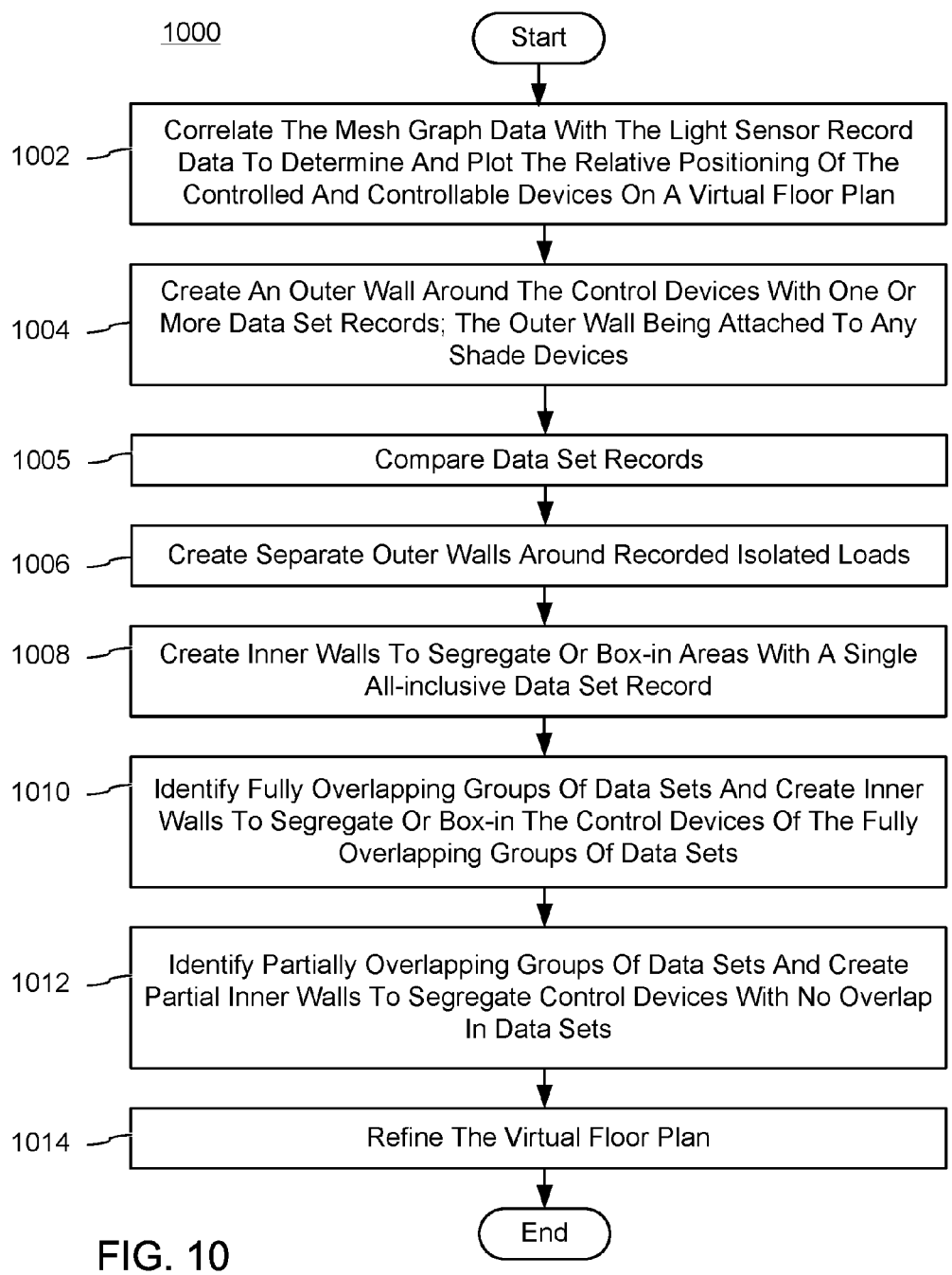
Figure 11A:
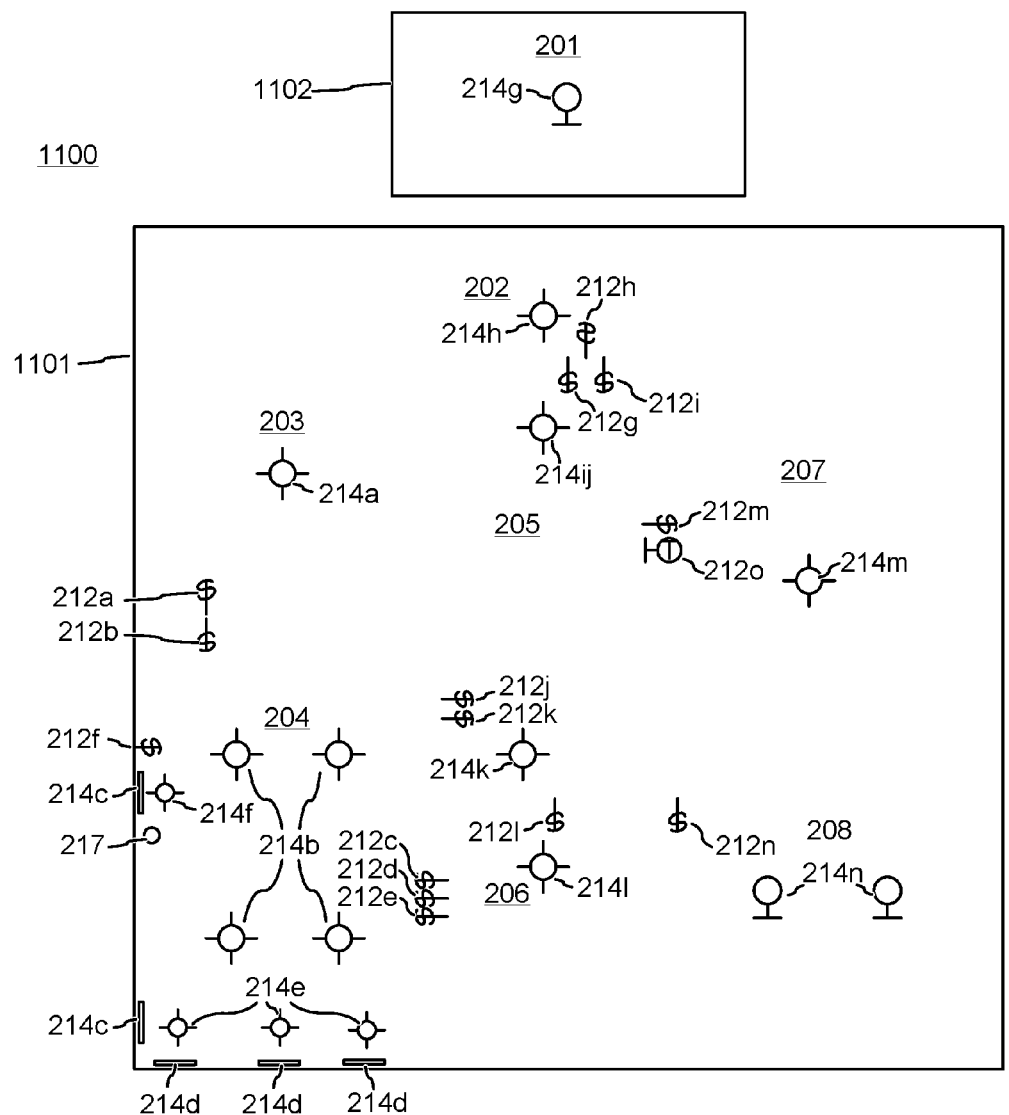
Figure 11B:
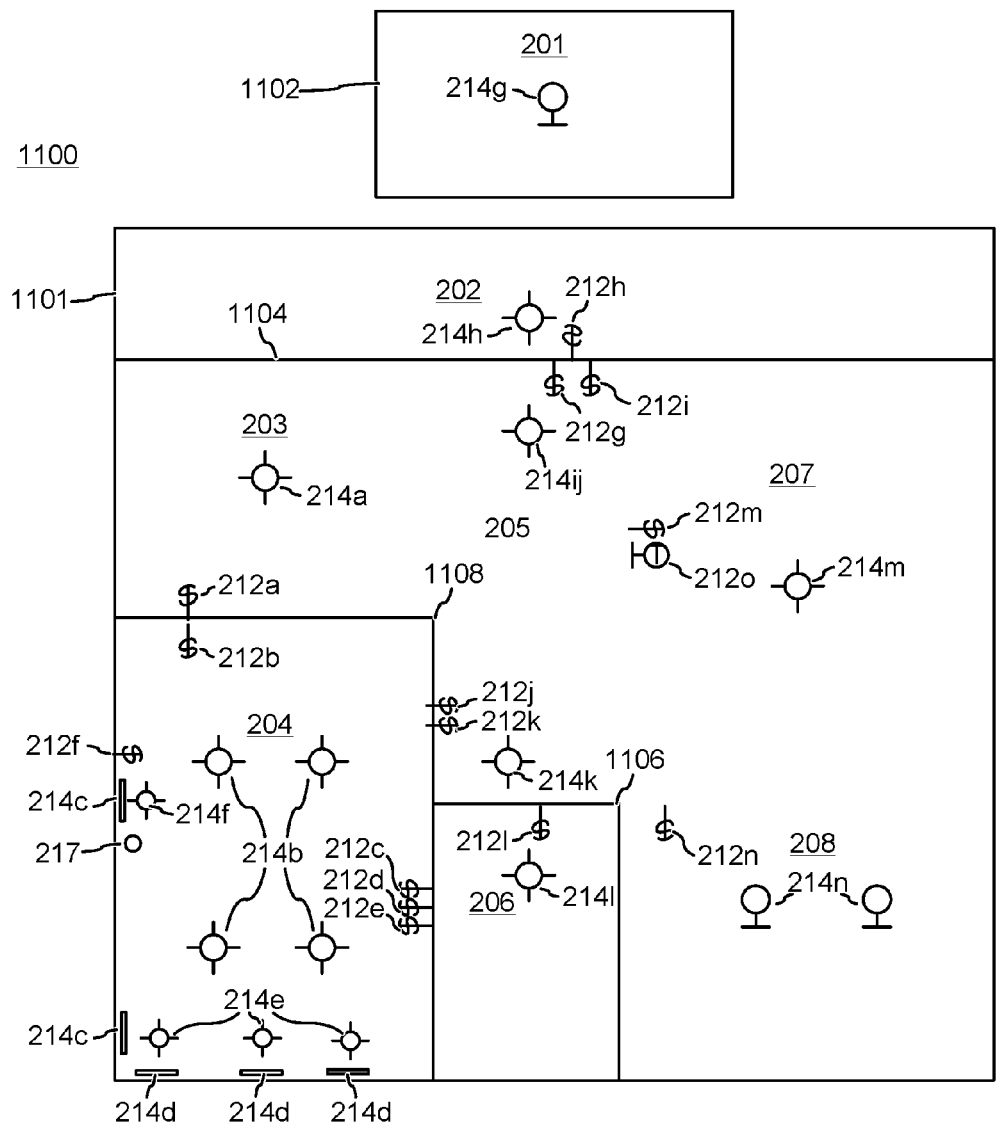
Figure 11C:
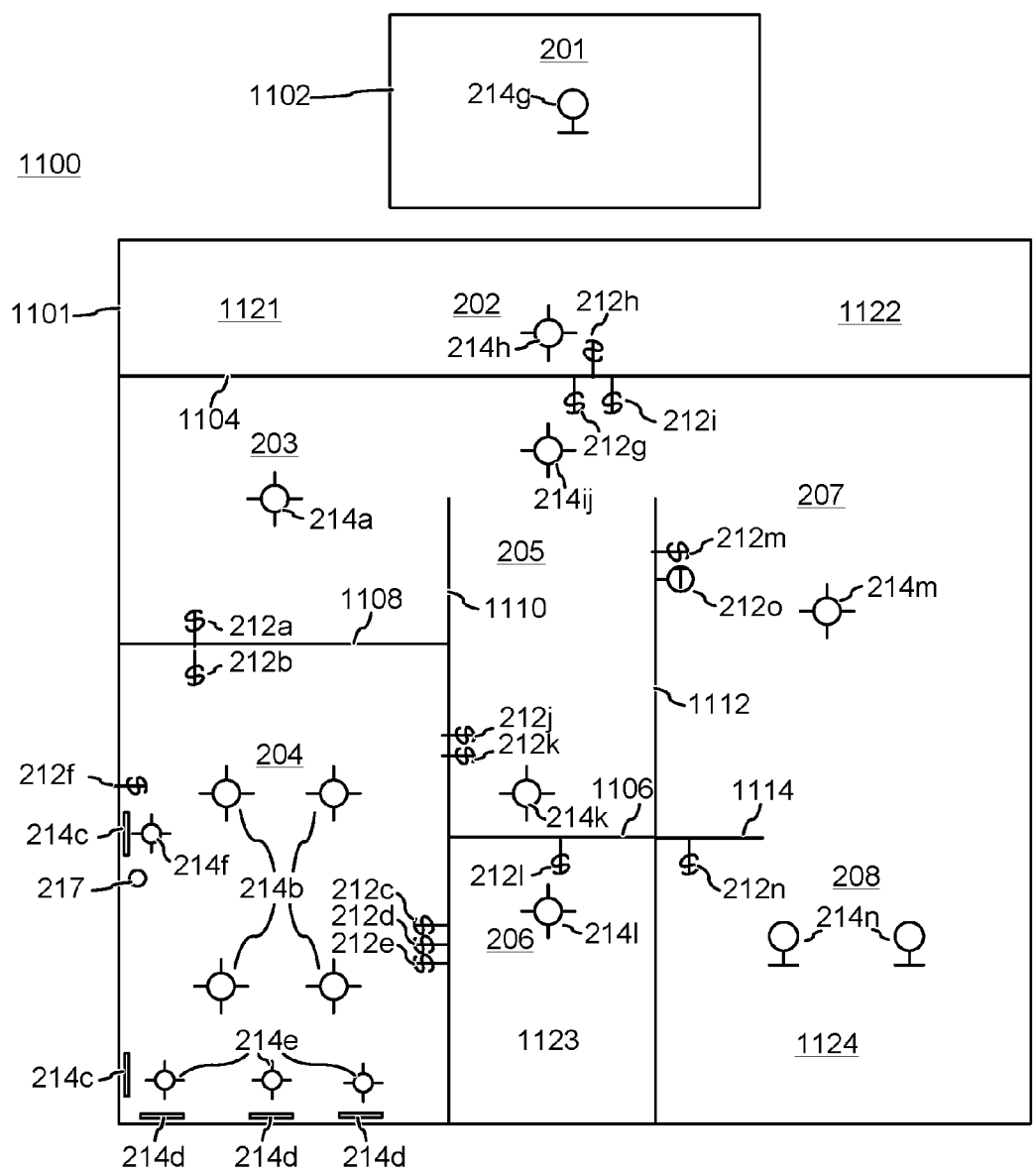
Figure 12A:
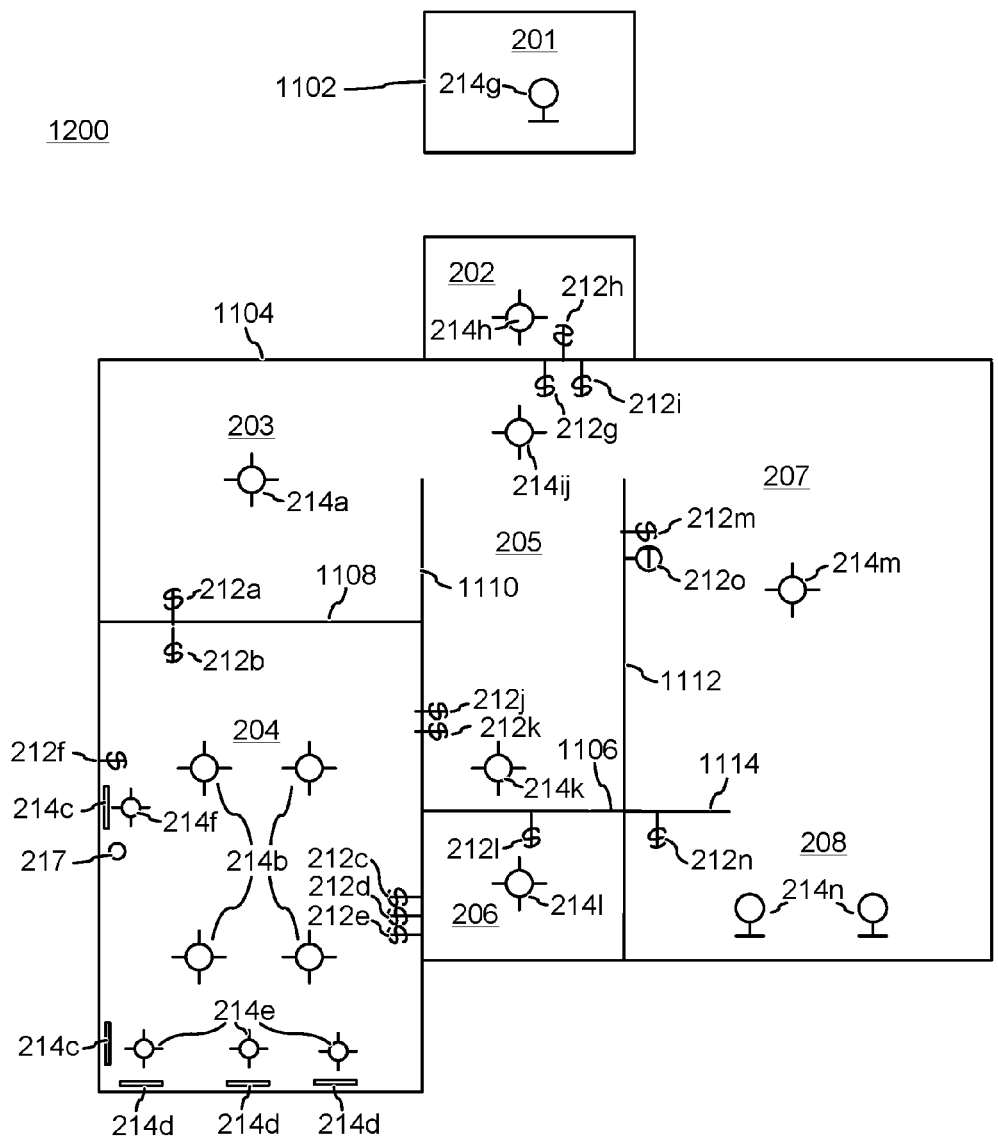
Figure 12B:
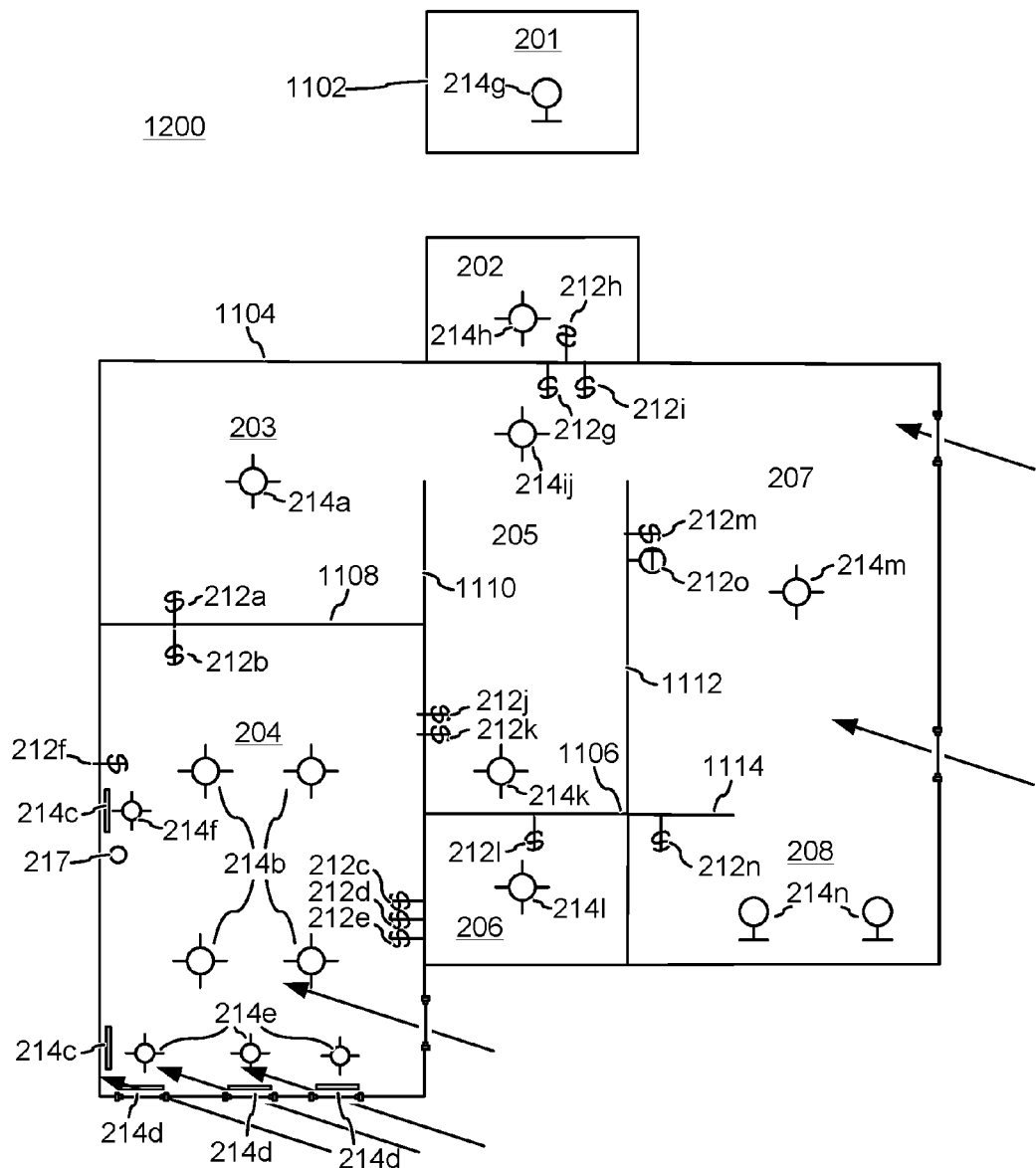
Figure 12C:
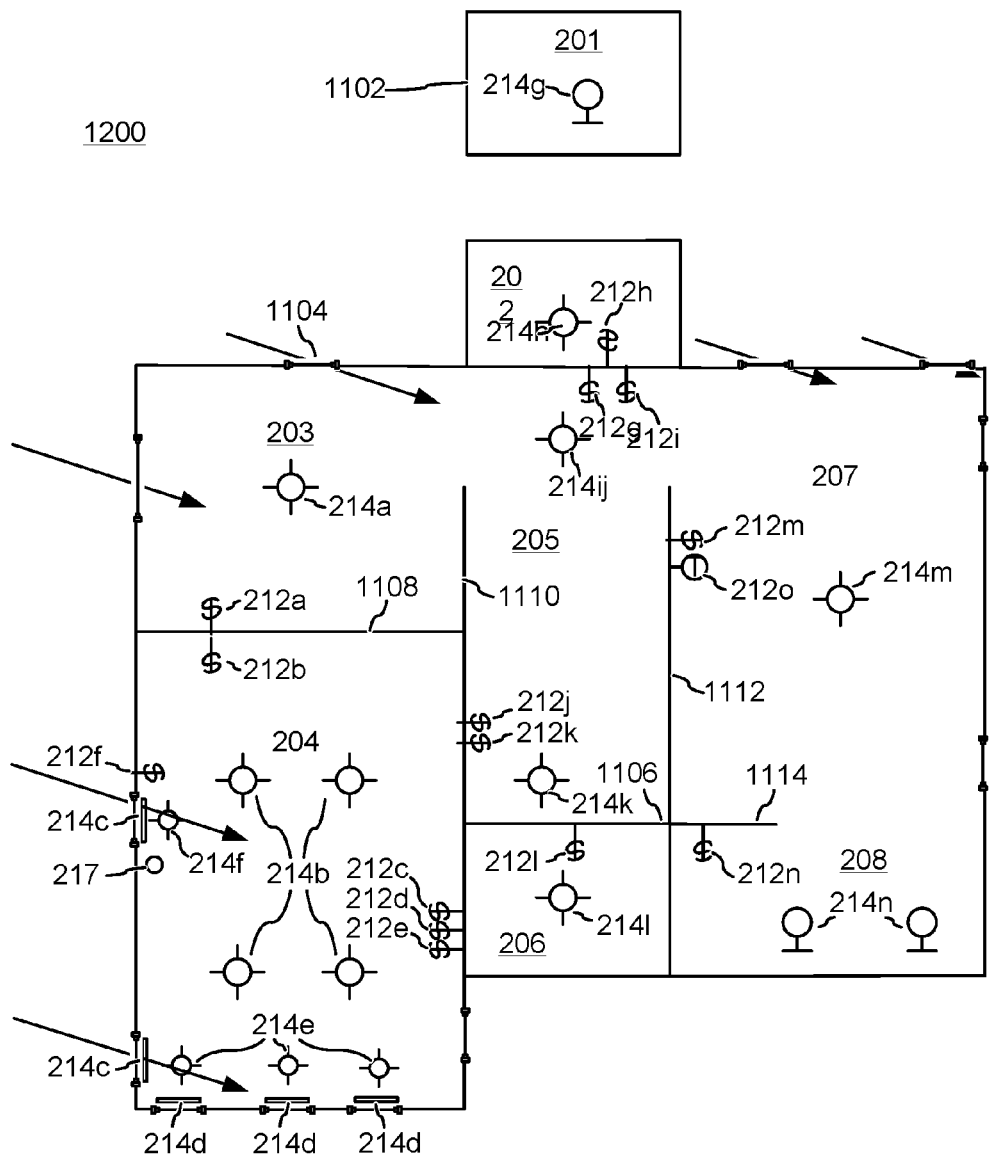
Figure 13:
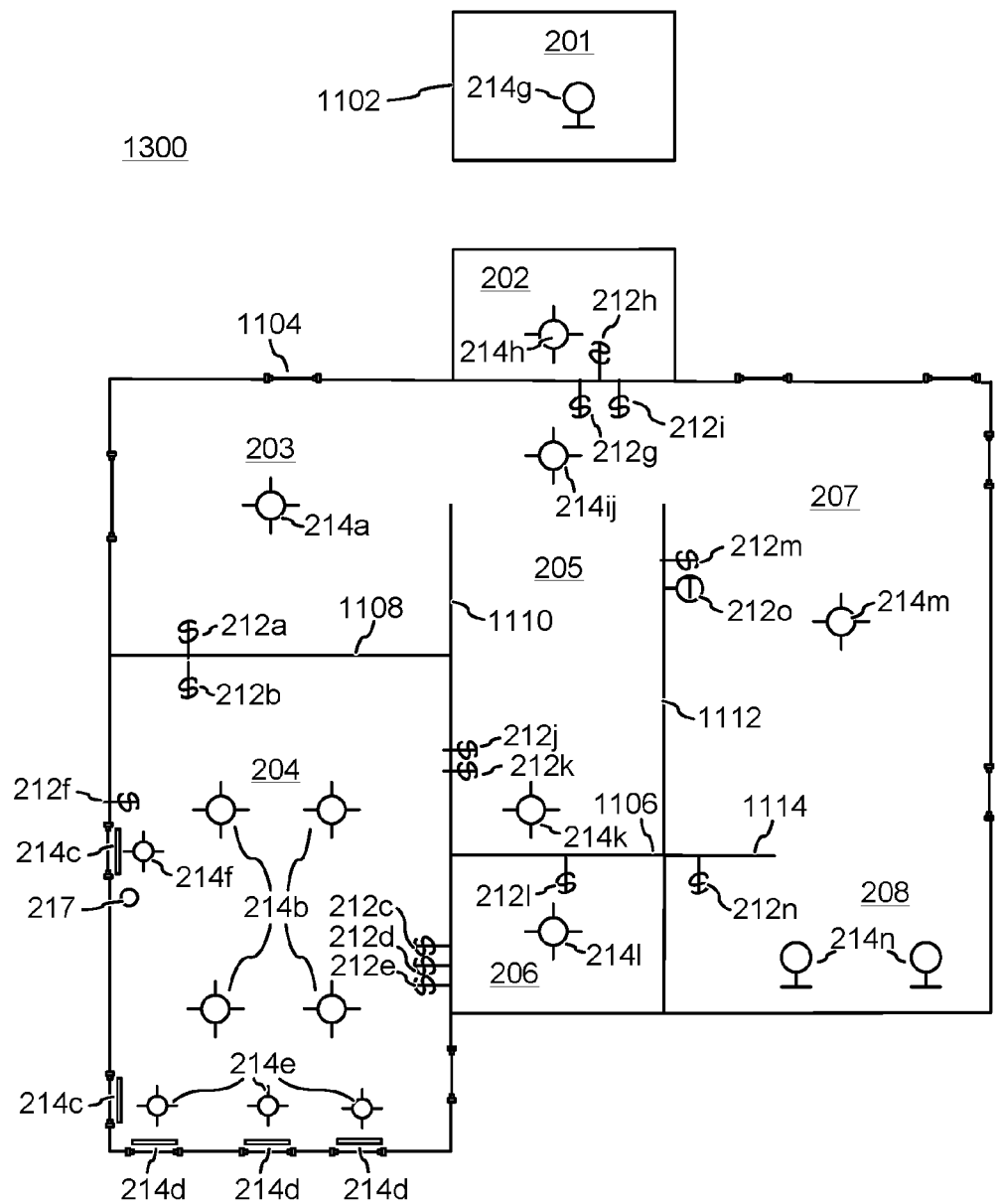
Figure 14:
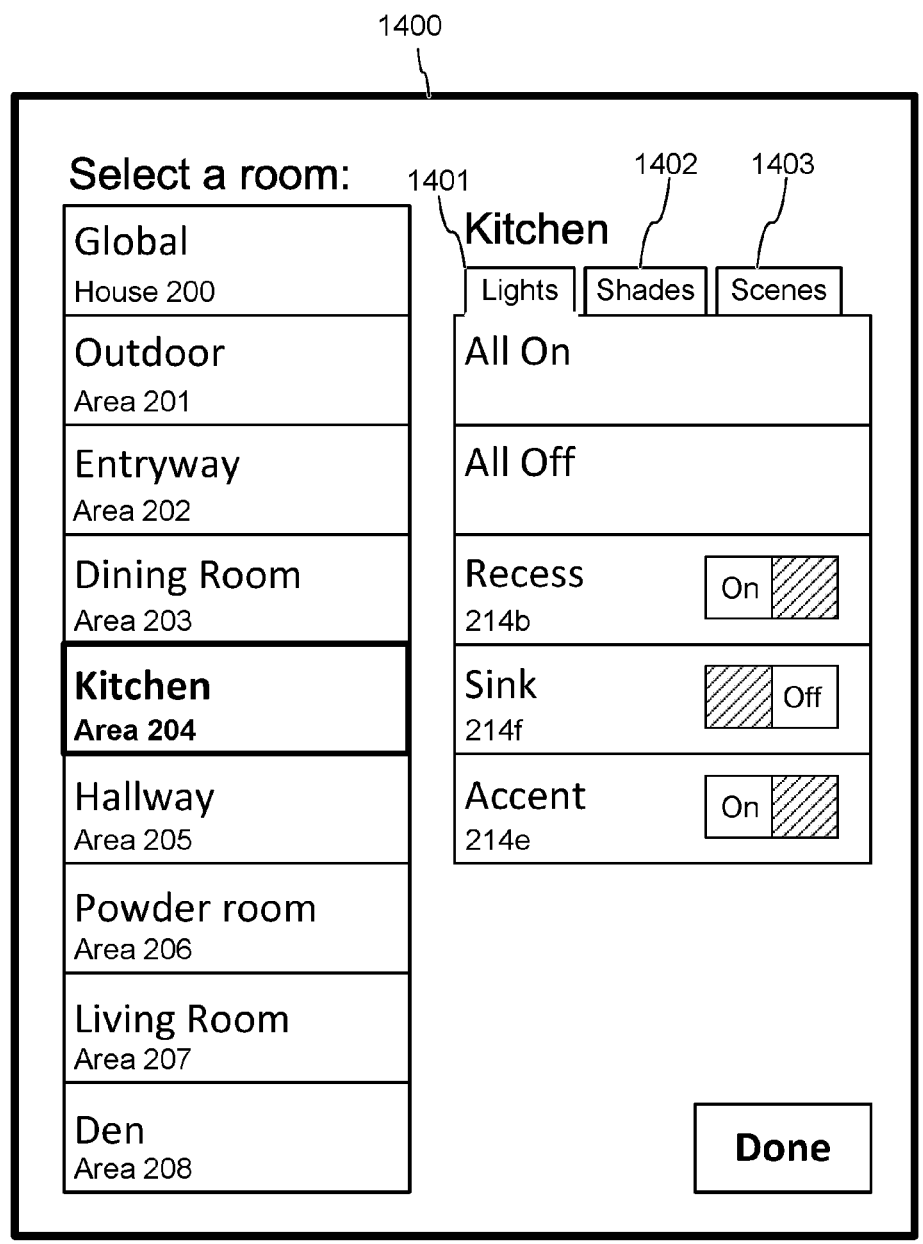

FIG. 1A illustrates a building management system according to an illustrative embodiment;

FIG. 1B illustrates a block diagram of a control processor of the building management system according to an illustrative embodiment;

FIG. 1C illustrates a block diagram of a control device of the building management system according to an illustrative embodiment;

FIG. 2 illustrates an exemplary floor plan of a house with an installed building management system according to an illustrative embodiment;

FIG. 3A illustrates a flowchart of a network initialization process of the building management system according to an illustrative embodiment;

FIG. 3B illustrates a signal flowchart during the network initialization process of FIG. 3A according to an illustrative embodiment;

FIG. 4 illustrates a flowchart of a configuration process of the building management system according to an illustrative embodiment;

FIG. 5A illustrates a signal flowchart between the devices of the building management system to acquire data for creating a wireless mesh graph according to an illustrative embodiment;

FIG. 5B illustrates a flowchart of a process for creating the mesh graph according to an illustrative embodiment;

FIG. 6 illustrates an exemplary mesh graph of the control devices and the sensor device of the building management system according to an illustrative embodiment;

FIG. 7A illustrates a signal flowchart between the devices of the building management system to acquire light sensor data during the light on/off operations according to an illustrative embodiment;

FIG. 7B illustrates a flowchart of the process for collecting and recording light sensor data sets during the light on/off operations according to an illustrative embodiment;

FIG. 8A illustrates a signal flowchart between the devices of the building management system to acquire light sensor data during the shade raise/lower operations according to an illustrative embodiment;

FIG. 8B illustrates a flowchart of the process for collecting and recording light sensor data sets during the shade raise/lower operations according to an illustrative embodiment;

FIG. 9 illustrates lighting intensity distribution exerted by the various lighting devices in proximity to the respective control devices and sensor devices having light sensors according to an illustrative embodiment;

FIG. 10 illustrates a flowchart of the process for creating the virtual floor plan according to an illustrative embodiment;

FIGS. 11A-11C show virtual floor plan plots illustrating the relative positioning of various devices of the building management system with respect to each other and the steps for creating walls to define the virtual floor plan according to an illustrative embodiment;

FIGS. 12A-12C show virtual floor plan plots illustrating the steps for refining the virtual floor plan according to an illustrative embodiment;

FIG. 13 illustrates the virtual floor plan according to an illustrative embodiment; and FIG. 14 illustrates an exemplary user interface of the building management system according to an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as mechanical and electrical equipment, including heating, ventilation and air conditioning (HVAC), lighting, shading, security, appliances, door locks, and audiovisual (AV) equipment.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

| | |
|---|---|
| 100 | Building Management System |
| 101 | Control Processor |
| 102a-e | Control Devices |
| 102a | Dimmer |
| 102b | Light Switch |
| 102c | Shade Control |
| 102d | Keypad |
| 102e | Thermostat |
| 104a-g | Controllable Devices |
| 104a | Lighting Device |
| 104b | Lighting Device |
| 104c | Shade Device |
| 104d | Lighting Device |
| 104e | Drapery Device |
| 104f | AV Device |
| 104g | HVAC Device |
| 105a-f | Light Sensors |
| 106a-e | Occupancy Sensors |
| 107 | Sensor Device |
| 110 | Communication Network |
| 111 | Server |
| 114 | Computer |
| 116 | Smartphone |
| 120 | Wireless Network |
| 121 | Central Processing Unit |
| 122 | Main Memory |
| 124 | Nonvolatile Memory |
| 125 | Wireless Network Interface |
| 126 | Analog Interface |
| 127 | Communication Network Interface |
| 131 | Central Processing Unit |
| 132 | Main Memory |
| 134 | Nonvolatile Memory |
| 135 | Wireless Network Interface |
| 136 | Analog Interface |
| 138 | Infrared Interface |
| 200 | House |
| 201-208 | Areas Of A House |
| 210 | Building Management System |
| 211 | Control Processor |
| 212a-o | Control Devices |
| 214a-n | Controllable Devices |
| 217 | Sensor Device |
| 220 | Door |
| 221 | Wall |
| 222 | Opening |
| 224 | Wall |
| 225 | Wall |
| 300 | Network Initialization Process Of The Building Management System |
| 301-303 | Steps Of Process 300 |
| 310 | Signal Flowchart Of The Network Initialization Process |
| 311 | Network Scan Operation |
| 314 | Network Joining Request |
| 316 | Network Joining Handshake Procedure |
| 318 | UID |
| 320 | Network Joining Operation |
| 400 | Configuration Process Of The Building Management System |
| 402-412 | Steps Of Process 400 |
| 500 | Process For Creating A Mesh Graph |
| 502-508 | Steps Of Process 500 |
| 510 | Signal Flowchart Between The Devices Of The Building Management System To Acquire Data For Creating A Wireless Mesh Graph |
| 512 | Command |
| 514 | Signal Strength Reading Operation |
| 516 | Data Packet Including UIDs And Signal Strength Data Of Other Control Devices |
| 518 | Configuration Data |
| 600 | Mesh Graph |
| 700 | Signal Flowchart Between The Devices Of The Building Management System To Acquire Light Sensor Output Level Data During The Light On/Off Operations |
| 702 | On/Off Command |
| 704 | On Operation |
| 706 | Light Sensor Reading Operation |
| 708 | Light Sensor Reading Operations |
| 710 | Off Operation |

-continued

| | |
|---|---|
| 712 | Light Sensor Reading Operation |
| 714 | Light Sensor Reading Operations |
| 716 | Light Sensor Output Level |
| 718 | Light Sensor Output Levels |
| 720 | Process For Collecting And Recording Light Sensor Data Records During Lights On/Off Operations |
| 722-750 | Steps Of Process 720 |
| 800 | Signal Flowchart Between The Devices Of The Building Management System To Acquire Light Sensor Output Level Data During The Shade Raise/Lower Operations |
| 802 | Raise/Lower Command |
| 804 | Raise Operation |
| 806 | Light Sensor Reading Operation |
| 808 | Light Sensor Reading Operations |
| 810 | Lower Operation |
| 812 | Light Sensor Reading Operation |
| 814 | Light Sensor Reading Operations |
| 816 | Light Sensor Output Level |
| 818 | Light Sensor Output Levels |
| 820 | Process For Collecting And Recording Light Sensor Data Records During Shade Raise/Lower Operations |
| 822-856 | Steps Of Process 820 |
| 900 | Lighting Intensity Distribution |
| 1000 | Process For Creating The Virtual Floor Plan |
| 1002-1014 | Steps Of Process 1000 |
| 1100 | Virtual Floor Plan Plot |
| 1101 | Outer Wall |
| 1102 | Outer Wall |
| 1104 | Inner Wall |
| 1106 | Inner Walls |
| 1108 | Inner Walls |
| 1110 | Partial Inner Wall |
| 1112 | Partial Inner Wall |
| 1114 | Partial Inner Wall |
| 1121-1124 | Void Areas |
| 1200 | Virtual Floor Plan Plot |
| 1300 | Virtual Floor Plan |
| 1400 | User Interface |
| 1401-1403 | Tabs |

LIST OF ACRONYMS USED IN THE SPECIFICATION IN ALPHABETICAL ORDER

The following is a list of the acronyms used in the specification in alphabetical order.

| | |
|---|---|
| ASICs | Application Specific Integrated Circuits |
| AV | Audiovisual |
| BAS | Building Automation Systems |
| BMS | Building Management Systems |
| CPU | Central Processing Unit |
| EMS | Energy Management Systems |
| GUI | Graphic User Interface |
| HVAC | Heating, Ventilation, Air Conditioning |
| IP | Internet Protocol |
| IR | Infrared |
| RAM | Random-Access Memory |
| RCPI | Received Channel Power Indicator |
| RF | Radio Frequency |
| RISC | Reduced Instruction Set |
| ROM | Read-Only Memory |
| RSSI | Received Signal Strength Indication |
| UID | Unique Identification Number |
| UWB | Ultra-Wideband Network |
| WPAN | Wireless Personal Area Network |

MODE(S) FOR CARRYING OUT THE INVENTION

The different aspects of the embodiments described herein pertain to the context of building automation, home automation, building automation systems (BAS), building management systems (BMS), and energy management systems (EMS) (collectively referred herein as "building management system"), but is not limited thereto, except as may be set forth expressly in the appended claims.

For 40 years Creston Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as 100 and 210 can be manufactured by Crestron Electronics, Inc., located in Rockleigh, N.J.

The present embodiments provide systems, methods, and modes for building automation, and more specifically for a building management system that is automatically configured without compromising the system's level of control. Beneficially, the building management system of the present embodiments self-configures upon installation, without having to manually program and locate the various control devices, controllable devices, and sensor devices distributed within a building. The embodiments allow for automatic location and room-by-room mapping of the various control devices, controllable devices, and sensor devices dispersed within a building to create a virtual floor plan of the installation area. Advantageously, the present embodiments simplify the initial setup process of the building management system during the installation process. The building management system uses a wireless mesh network data and sensor data to create the virtual floor plan. The virtual floor plan can be used for seamless and enhanced control of the various controllable devices within the building, and to effectively monitor and report the state of the building in a user friendly manner, without manual configuration. The embodiments of the building management system can be used in small, mid, or large scale residential or commercial installations. The building management system of the present embodiments can control numerous controllable devices, including one or more of HVAC, lighting, shading, security, appliances, door locks, and AV equipment, among others.

FIG. 1A shows a building management system 100 that can be used in small, mid, or large scale commercial or residential installations, according to one embodiment. The building management system 100 comprises a control processor 101, one or more control devices 102a-e, and one or more sensor devices 107 interconnected via a wireless network 120. Each of the control devices 102a-e is associated with and controls one or more corresponding controllable devices 104a-g. The control processor 101 of the building management system 100 operates to control and monitor one or more controllable devices 104a-g via control devices 102a-e, and one or more sensor devices 107. One or more controllable devices 104a-g can comprise lighting devices 104a, 104b, and 104d, shade and drapery devices 104c and 104e, AV device 104f, and HVAC device 104g, as an illustrative embodiment. Those skilled in the art will recognize that additional control devices and/or controllable devices can operate on the network.

The building management system 100 can further comprise a communication network 110, a server 111, and one or more user devices, such as a computer 114 and a smartphone 116. Control processor 101 can communicate with server 111 via communication network 110 to obtain various data or to report data collected by the remote server 111. Server 111 can further provide enhanced services and information to the building management system 100. User devices 114 and 116 allow a user to remotely monitor and control a building's lighting, climate, and security system, for example, from another location.

The control devices 102a-e and sensor devices 107 intercommunicate with each other and with the control processor 101 using the wireless network 120. In another embodiment, the control processor 101 is hard-wired to each of the control devices 104a-g and sensor devices 107. In one embodiment, wireless network 120 can comprise one or more wireless personal area networks (WPANs). Communication protocols govern the operation of the wireless network 120 of the building management system 100 by governing network formation, communication, interferences, and other operational characteristics. For example, one such protocol is the ZigBee® protocol from the ZigBee Alliance. Another wireless communication protocol is the infiNET EX® protocol from Crestron Electronics, Inc. of Rockleigh, N.J. infiNET EX® is an extremely reliable and affordable protocol that is employed by 2-way wireless wall box dimmers and switches, lamp dimmers and switches, plus thermostats and keypads, and other sensors and control devices. infiNET EX® utilizes 16 channels on an embedded 2.4 GHz radio frequency (RF) wireless network, providing more stable, reliable wireless communications over larger areas without the need for additional control wiring.

In an embodiment, the wireless network 120 of the building management system 100 between control processor 101, control devices 102a-e, and one or more sensor devices 107 is automatically formed upon installation during a wireless network initialization process. Many of the configuration properties for forming the wireless network 120 can be preconfigured prior to initialization. In one embodiment, the system can employ the commissioning process for forming the wireless network disclosed in U.S. patent application Ser. No. 13/909,009, filed Jun. 3, 2013, and titled "Commissioning of Wireless Devices in Personal Area Networks," the entire contents of which are hereby incorporated by reference.

FIG. 1B is an illustrative block diagram of the control processor 101. For example, the building management system 100 can utilize the PRO3 control processor available from Crestron Electronics, Inc. to network, manage, and control the building management system 100. In one embodiment, the control processor 101 comprises at least one central processing unit (CPU) 121. The CPU 121 can represent one or more microprocessors, and the microprocessors can be "general purpose" microprocessors, a combination of general and special purpose microprocessors, or application specific integrated circuits (ASICs). Additionally or alternatively, the CPU 121 can include one or more reduced instruction set (RISC) processors, video processors, or related chip sets. The CPU 121 can provide processing capability to execute an operating system, run various applications, and/or provide processing for one or more of the techniques and functions described herein. Applications that can run on the control processor 101 can include, for example, software for initiating the wireless network 120 and software for configuring and operating the building management system 100 as will be described more fully below.

In an embodiment, the control processor 101 includes a main memory 122 and nonvolatile memory 124. Main memory 122 can be communicably coupled to the CPU 121, which can store data and executable code. The main memory 122 can represent volatile memory such as random-access memory (RAM), but can also include nonvolatile memory, such as read-only memory (ROM) or Flash memory. In buffering or caching data related to operations of the CPU 121, the main memory 122 can store data associated with applications running on the control processor 101. The nonvolatile memory 124 can represent any suitable nonvolatile storage medium, such as a hard disk drive or nonvolatile memory, such as Flash memory. Being well-suited to long-term storage, the nonvolatile storage 124 can store data files, software for implementing the functions on the control processor 101, and wireless connection information to establish the wireless network 120.

The control processor 101 further comprises one or more interfaces, including a wireless network interface 125, an analog interface 126, and a communication network interface 127. The communication network interface 127 is configured to receive information from the communication network 110 through, for example, a router. According to an embodiment, the network interface 127 is an Ethernet interface for sending and receiving signals over an Internet Protocol (IP) based network.

The control processor 101 can communication with the control devices 102a-e and one or more sensor devices 107 via wireless network interface 125 and/or analog interface 126. An analog interface 126 can provide a wired connection for communicating with control devices 102a-e and sensor devices 107. According to one embodiment, the wireless network interface 125 can comprise a bidirectional RF or Infrared (IR) transceiver designed to enable communications and management of the infiNET EX® wireless network of control devices, sensor devices, and other devices. Wireless network interface 125 can further provide capabilities to network with, for example, a Bluetooth® network, an IEEE 802.15.4 (e.g., ZigBee) network, or an ultra-wideband network (UWB). As should be appreciated, the networks accessed by the wireless network interface 125 can, but do not necessarily, represent low power, low rate, low bandwidth, or close range wireless connections. The wireless network interface 125 can permit one electronic device to connect to another electronic device via an ad-hoc or peer-to-peer connection. The control processor 101 can use one or more gateways to communicate with the control devices 102a-e and one or more sensor devices 107 and support additional devices. In addition, wireless expanders can be added wherever needed to extend the wireless network 120 by filling-in gaps between devices.

FIG. 1C is an illustrative block diagram of a control device 102a-e. Each control device 102a-e, as well as sensor device 107, comprises a wireless network interface 135, such as an RF or IR transceiver, configured for bidirectional wireless communication on the wireless network 120. Control devices 102a-e can intercommunicate with each other, as well as with the control processor 101, using the wireless network interface 135. Each control device 102a-e can further comprise an analog interface 136 for directly controlling one or more controllable devices 104a-g through, for example, an electric wire connection. In addition, or in another embodiment, one or more of control devices 102a-e can comprise an IR interface 138 for allowing the control device 102a-e to act as a remote control to directly control one or more controllable devices 104a-g. Each control device 102a-e can further comprise a CPU 131, such as CPU 121 described in greater detail above. CPU 131 can process various commands and perform operations requested by the other control devices 102a-e, or the control processor 101, as will be described in greater detail below. Each control device 102*a-e* can further include a main memory 132 and a nonvolatile memory 134, such as memories 122 and 124 described in greater detail above.

Referring to FIG. 1A, one or more control devices 102*a-e* can comprise a dimmer 102*a*, a light switch 102*b*, a shade control 102*c*, a keypad 102*d*, a thermostat 102*e*, and other control devices. Dimmer 102*a* is configured for dimming one or more lighting devices 104*a*. For example, dimmer 102*a* can comprise similar configuration to the CLW-DI-MEX-P Cameo® Wireless In-Wall Dimmer available from Crestron Electronics, Inc. of Rockleigh, N.J. Light switch 102*b* turns lighting device 104*b* on and off and can comprise similar configuration to the CLW-SWEX-P Cameo® Wireless In-Wall Switch available from Crestron Electronics, Inc. of Rockleigh, N.J. Shade control 102*c* lowers and raises a shade device 104*c* to a desired level. Keypad 102*d* can comprise a plurality of buttons to control multiple controllable devices, such as lighting device 104*d*, drapery device 104*e*, and AV device 104*f*. Keypad 102*d* can comprise similar configuration to the INET-CBDEX-P Cameo® Wireless Keypad w/infiNET EX® available from Crestron Electronics, Inc. of Rockleigh, N.J. Thermostat 102*e* is configured for heating and cooling control of baseboard, forced air, heat pump, and dual fuel heat pump HVAC systems. In an example, thermostat 102*e* can comprise similar configuration to the CHV-TSTATEX Thermostat available from Crestron Electronics, Inc. of Rockleigh, N.J.

Each control device 102*a-e* comprises a light sensor 105*a-e* to detect light intensities. The light sensors 105*a-e* can comprise a dual-loop photosensor having two internal photocells with 0-65535 lux (0-6089 foot-candles) light sensing, one for open-loop daylight sensing and one for closed-loop ambient light sensing to measures light intensity from natural daylight and ambient light sources. Each control device 102*a-e* operates its light sensor 105*a-e* to measure the light intensity in the room. The control devices 102*a-e* communicate the detected light intensity from the light sensors 105*a-e* to control processor 101. Building management system 100 can further comprise one or more sensor devices 107 each having a light sensor 105*f* that communicates its detected light intensity to the control processor 101. Detected light intensities can be used to locate the control devices 102*a-e* and the sensor devices 107 within rooms of a building during the initialization of the building management system 100 as will be later described. Beneficially, detected light intensities can be further used in operation of the building management system 100, for example, for daylight harvesting to effectively cut energy costs.

Each control device 102*a-e* can be further associated with an occupancy sensor 106*a-e* to enhance the configuration as well as the functionality of the building management system 100 and reduce energy costs. In some embodiments, the control devices 102*b-e* can each incorporate an occupancy sensor 106*b-e*. In other embodiments, a separate sensor device 107 can be installed in a room together with a control device 102*a*. The sensor device 107 can contain an occupancy sensor 106*a* and communicate its sensed output to the control device 102*a*. An exemplary sensor device 107 includes the GLS-ODT-C-CN Dual-Technology Occupancy Sensor with Cresnet®, available from Crestron Electronics, Inc. of Rockleigh, N.J. Each occupancy sensor 106*a-e* can comprise an infrared sensor that generates a signal based on sensed infrared radiation of the monitored area. A Fresnel lens covers the infrared sensor for focusing the light to the infrared sensor. In addition, or alternatively, each occupancy sensor 106*a-e* comprises an ultrasonic sensor to detect motion.

Occupancy sensors 106*a-e* detect the occupancy state of a room in a building and generate an occupancy signal based on the occupancy state of that monitored area. For example, the occupancy sensor can generate a binary signal with one logical level representing an occupied state and the other logic level representing a vacant state. Occupancy determinations can be dependent on a number of settings of the occupancy sensor 106*a-e*, which can be preconfigured or configured through physical interfaces on the occupancy sensor 106*a-e* or remotely via a graphic user interface (GUI) or remote control. Additionally, sensitivity settings can be determined according to one or more factors such as time event, including time of day, day of week or month of year, a scheduled event, the current occupancy state of the monitored area, or the occupancy state of another area. The sensitivity setting can be determined either locally at the occupancy sensor 106*a-e* or at a network device and transmitted to the occupancy sensor 106*a-e*. For example, the timeout period of the occupancy sensor 106*a-e* can be set. Additionally, the sensitivity of the individual sensors can be set. Finally, the physical direction of the sensors operational range can be set by altering a mask of the occupancy sensor 106*a-e*.

The control devices 102*a-e* and sensor devices 107 can comprise various types of sensors. In various embodiments, control devices 102*a-e* and sensor devices 107 can comprise one or more of light sensors, infrared sensors, photosensors, ultrasonic sensors, various motion sensors, occupancy sensors, proximity sensors, sound sensors, microphones, ambient temperature sensors, or the like. The sensors can be used to assist in creating the virtual floor plan and to enhance the operation of the building management system 100.

The control devices 102*a-e* and any sensor devices 107 can intercommunicate with each other and with the control processor 101 wirelessly using the infiNET EX® protocol, or other types of protocols known in the art. Control devices 102*a-e* and sensor device 107 operate on the wireless network 120 by joining the network and being acquired by the control processor 101, or through other intermediate devices such as gateways, during a wireless network initialization process. Each control device 102*a-e* and sensor device 107 comprises a unique identification number (UID). During the initialization process, as well as during the operation of the building management system, each control device 102*a-e* and sensor device 107 reports its UID to uniquely identify itself to the other control devices 102*a-e* and to the control processor 101. In addition, during the configuration process of the building management system, each control device 102*a-e* also maintains and reports to the control processor 101 data indicating what type of sensor output and user input it has available. In another embodiment, server 111 maintains an inventory of various control devices 102*a-e* according to their UIDs. During the configuration process, the control processor 101 receives the UIDs from the control devices 102*a-e* and queries the server 111 for the data indicating what type of sensor output and user input the control devices 102*a-e* contain. Additionally, during the configuration of the building management system, each control device 102*a-e* determines and reports the number and type of loads or controllable devices that are controlled directly by it.

FIG. 2 illustrates an exemplary floor plan of a house 200 having a plurality of living areas 201-208 with an installed building management system 210 of the present embodiment. Illustrated is the building management system 210 having a control processor 211, a sensor device 217, as well as various control devices 212*a-o*, such as switches, dimmers, keypads, and a thermostat. As previously discussed, each such control device 212*a-o* and sensor device 217 comprises a light sensor. The control devices 212*a-o* are installed to control various loads, or controllable devices 214*a-n*, such as lighting devices, shade devices, and HVAC device.

FIG. 3A provides details of the network initialization process 300 of the building management system 210 according to further aspects of the embodiments. Referring to FIGS. 2 and 3A, after installation of the building management system 210, the building management system 210 beings a wireless network initialization process 300. During the wireless network initialization process 300, in step 301, the control processor 211 receives network joining requests from the control devices 212*a-o* installed within the house 200. The control processor 211 and the control devices 212*a-o* then perform joining handshakes in step 302. The control processor 211 then joins the control devices 212*a-o* to the wireless network in step 303.

FIG. 3B illustrates a signal flowchart 310 between the devices of the building management system 210 during the network initialization process. Referring to FIGS. 2 and 3B, each control device, such as control device 212*a*, starts performing a network scan operation 311. Control device 212*a* can be triggered to start performing a network scan operation 311 by, for example, pressing and holding, or double tapping, a pad on the control device 212*a*. After finding the wireless network of the building management system 210, the control device 212*a* sends a network joining request 314 to the control processor 211. According to one aspect of the embodiments, the control device 212*a* can attempt to join a network by executing the join procedure of the ZigBee® protocol. The control device 212*a* and the control processor 211 can execute a network joining handshake procedure 316. During the network initialization process, the control device 212*a* transmits to the control processor 211 its UID 318 to uniquely identify itself to the control processor 211. The control device 212*a* then joins the wireless network of the building management system 210 at operation 320. This process is repeated until all the control devices 212*a-o* are joined to the wireless network. The sensor device 217 and other control devices of the building management system 210 are joined to the network in similar manner.

In another embodiment, once all the control devices 212*a-o* and sensor devices 217 are installed in the building, such as house 200, the control processor 211 is configured to search or scan for and send wireless network joining requests to the control devices 212*a-o* and sensor devices 217.

After the wireless network of the building management system 210 is formed by joining all of the control devices 212*a-o* and sensor devices 217, the building management system 210 self-configures by undergoing an automatic configuration process. FIG. 4 provides a description of the configuration process 400 of the building management system 210. Initially, in step 402, the control processor 211 receives signal strengths of control devices 212*a-o*, as well as any sensor devices 217, relative to each other. Using the wireless signal strength data, the control processor 211 creates a mesh graph of relative positioning of the control devices to each other in step 404. In step 406, the control processor 211 then cycles through and commands each lighting control device, such as lighting control device or switch 212*a*, to perform an on/off operation as will be described in a greater detail below. In step 408, the control processor 211 commands the light sensors, such as light sensors 105*a-f* described above, of the various control devices 212*a-o* to record light intensities before and after each on/off operation. In step 410, the control processor 211 combines the mesh graph data with the light sensor data to create the virtual floor plan in step 412.

FIG. 5A shows a signal flowchart 510 between the devices of the building management system 210 to acquire data for creating the wireless mesh graph according to an illustrative embodiment. Referring to FIG. 5A, the control processor 211 sends a command 512 to all of the networked components within the house 200 of the building management system 210, including the control devices 212*a-o* and sensor devices 217, in order to get their relative positioning relative to each other. For example, control processor 211 sends a command 512 to control device 212*a* requesting the control device 212*a* to read and measure the received wireless signal strengths of other control devices 212*b-o*, as well as any sensor devices 217, within the building management system 210. In response, control device 212*a* connects with control devices 212*b-o*, and sensor device 217, and performs a signal strength reading operation 514 to determine the signal strengths of control devices 212*b-o*, and sensor device 217, relative to control device 212*a*. In other words, the control device 212*a* measures the intensity of the received radio wave signals from control devices 212*b-o*, and sensor device 217, relative to itself. For example, this can be accomplished using the Received Signal Strength Indication (RSSI) or the Received Channel Power Indicator (RCPI) techniques. Control device 212*a* also receives UIDs of the control devices 212*b-o*, and sensor device 217, and pairs the received UIDs with the corresponding signal strength data. Control device 212*a* delivers to the control processor 211 a data packet 516 including its UID data, as well as the paired data including the UIDs and signal strengths of each control device 212*b-o*, and sensor device 217, relative to control device 212*a*. The process shown in FIG. 5A is repeated for each wireless component of the building management system 210, including control devices 212*a-o* and sensor devices 217.

In addition, anytime before, during, or after the configuration process, each control device 212*a-o*, and sensor device 217, transmits to the control processor its configuration data 518, which can include one or more of the following: the type(s) of load(s) it directly controls (i.e., whether it is a lighting device, shading device, AV device, HVAC device, etc.), the number of loads it directly controls, the type of sensor output and user input it has available, among others. As discussed above, some of this data can be acquired from a remove server 111 (FIG. 1A). This configuration data 518 can be stored in the memory of the control processor 211 for each control device 212*a-o*, and sensor device 217, identified by their respective UID. The control processor 101 can store this information in a table.

FIG. 5B provides details of the process 500 for creating the mesh graph of the relative positioning of the control devices and sensor devices to each other according to an illustrative embodiment. Referring to FIG. 5B, in step 502, the control processor 211 receives the signal strengths data of the various control devices 212*a-o*, and sensor device 217, relative with each other. The control processor 211 can store this data in a table. In step 504, the control processor 211 uses this data to determine the distances between the control devices relative to each other. In step 506, the control processor 211 uses signal strength data to determine the location of the control devices 212*a-o*, as well as any sensor devices 217, with respect to each other. The control processor 211 can use a trilateration technique to map the signal strength as a function of distance to generate an (x,y,z) location prediction. In another embodiment, the control processor 211 can use the fingerprinting or triangulation techniques to generate a predicted (x,y,z) location. Other known or later discovered positioning technique using the signal strength measurements can be utilized without departing from the scope of the present embodiments. Using the distance data and location data of each wireless component of the building management system 210, in step 508, the control processor 211 creates a mesh graph of relative position of the control devices 212a-o, as well as any sensor devices 217. FIG. 6 illustrates an exemplary mesh graph 600 of the control devices 212a-o and the sensor device 217 of building management system 210 installed in house 200.

FIG. 7A illustrates a signal flowchart 700 between the devices of the building management system 210 to acquire light sensor output level data during light on/off operations from the light sensors of the various control devices 212a-o, and any sensor devices 217. The control processor 211 commands each lighting control device to turn on and off its load once, while the light sensors of all control devices 212a-o and sensor device 217 record the light intensities when the light load is on and when the light load is off to mark the change. Particularly, referring to FIG. 7A, the control processor 211 sends an on/off command 702 one at a time to each lighting control device—i.e., a control device that directly operates a lighting load. For example, control processor 211 sends an on/off command 702 to lighting control device 212a that operates a lighting device 214a (as shown in FIG. 2) and designates it as an operating lighting control device. In response, the operating lighting control device 212a performs an on operation 704 by turning on the lighting device 214a.

Operating lighting control device 212a then performs a light sensor reading operation 706 by reading its light sensor output level. In addition, all other wireless components of the building management system 210 having a light sensor, including control devices 212b-o, and any sensor devices 217, perform light sensor reading operations 708 by reading their light sensor output levels. Control devices 212b-o, and any sensor devices 217, can be prompted either by the operating lighting control device 212a or by the control processor 211 to perform the reading operation 708. Operating control device 212a then performs an off operation 710 by turning off the lighting device 214a. Again, the operating control device 212a and the other control devices 212b-o, as well as any sensor devices 217, perform light sensor reading operations 712 and 714, respectively, by reading their light sensor output levels. The operating control device 212a, and the other control devices 212b-o, as well as any sensor devices 217, report their read light sensor output levels 716 and 718 relative to lighting device 214a to the control processor 211. It should be appreciated that the above steps are exemplary and can be performed in various orders. For example, light sensor reading operations 712 and 714 can be performed before the turning on operation 704 of lighting device 214a.

The communication illustrated in FIG. 7A is cycled through, one at a time, every pair of light control device and its lighting load of the building management system 210. Namely, after lighting control device 212a completes the on/off operation, the control processor 211 designates another lighting control device, for example, lighting control device 212b that operates lighting devices 214b, as an operating lighting control device and the communication process shown in FIG. 7A repeats for lighting control device 212b.

FIG. 7B provides details of the process 720 for collecting and recording light sensor data records during light on/off operations to be used to create the virtual floor plan of the present embodiments. In step 722, the control processor 211 commands a lighting control device, to perform a light on/off operation. For example, referring to FIG. 2, the control processor 211 first commands lighting control device 212a to perform a light on/off operation on its load 214a. The lighting control device 212a performs a light on/off operation per FIG. 7A. In step 724, the control processor 211 receives light intensities from a control device having a light sensor before and after the on/off operation. For example, the control processor 211 first receives light intensities from lighting control device 212a. In step 726, the received light intensity readings before and after the on/off operation are compared to perceive whether the light intensity has changed 728. For example, when lighting control device 212a performs the on/off operation on its load 214a, both located in living area 203, its light sensor would perceive a change in the light intensity. As such, in step 734, a data set is recorded for the control device 214a with changed light intensities. The data set can include one or more of the following: the UID of the operating control device (and by proxy identification of its load), UID of the control device from which the sensor data was received, and the determined change in light intensity. The change in light intensity is determined as a function of the change in the light intensities read by the light sensor of lighting control device 212a between when the light load 212a is turned on and when the light load 212a is turned off. Accordingly, any daylight reading is disregarded in the light intensity record.

If there are additional control devices that report their sensor's read light intensities in step 736, the control processor 211 returns to step 724 and repeats the above comparison for each received data set and depending on the result either records 734 or discards 732 the data set. For example, control processor 211 next receives light sensor levels from lighting control device 212b, which is located in living area 204 and separated from light load 214a by a wall 221 and a door 220. Light sensor of control device 212b would not perceive any change in the light intensity when lighting device 214a was turned on and off. In one embodiment, the on/off operations are performed with any doors of the building closed for greater accuracy. For readings with no perceived light intensity change, the received data set is discarded in step 732. In one embodiment, data sets are discarded when there is no perceivable light intensity change. In another embodiment, data sets are discarded when the light intensity change falls below a predetermined threshold value.

Data sets, including the light intensities, after the on/off operation on lighting device 214a are also recorded for control devices 212g and 212i located in living area 205, which are in the field of view of lighting device 214a in living area 203 via opening 222. Control devices 212j and 212k, located in living area 205, are not in the field of view of lighting device 214a, but can receive a low light intensity reading of light sipping through opening 222. Data sets for control devices 212j and 212k can be discarded for falling below a predetermined threshold level. In the on/off operation on lighting device 214a, for example, data sets including light intensities are recorded for lighting controls 212a, 212g, and 212i, while the readings detected by the light sensors of the remainder of the control devices and sensor devices of the house 200 are discarded for having no changes in light intensities, or for falling below the predetermined threshold value.

After all control devices and sensor devices report the light intensities of their light sensors, in step 738, the control processor 211 determines whether at least one data set was recorded. In this scenario, data sets were recorded for control devices 212a, 212g, and 212i. In step 742, the control processor 211 determines and records the distances between the lighting device 214a and the control devices 212a, 212g, and 212i based on the recorded light intensities. In one embodiment, an inverse square law of light formulas shown below can be used to calculate the distances as the intensity of light is inversely proportional to the square of the distance:

$$\text{Intensity} \propto \frac{1}{\text{Distance}^2}$$

$$\frac{\text{Intensity}_1}{\text{Intensity}_2} = \frac{\text{Distance}_2^2}{\text{Distance}_1^2}$$

Light intensity recorded for lighting control 212a would indicate that lighting control 212a is in close proximity to lighting device 214a. Light intensities of control devices 212g and 212i would indicate that control devices 212g and 212i are at a greater distance from lighting device 214a.

In step 744, the control processor 211 determines whether at least two data sets were recorded for the on/off operation. If so, the two or more data sets are grouped into a group of data sets in step 746. Since three data sets were recorded for control devices 212a, 212g, and 212i during the on/off operation of the lighting device 214a, these data sets are grouped together into a group of data sets.

In step 748, the control processor 211 determines whether there are more lighting control devices that need to perform the on/off operation. If yes, the process returns to step 722. For example, control processor 211 next commands lighting control device 212h to perform an on/off operation on its lighting load 214h located in living area 202. Since there is only a single control device 212h with a light sensor present in living area 202, only a single data set record will be determined in step 744. It would not be grouped with other data sets and would remain as a single data set record.

In another embodiment, control processor 211 next commands lighting control device 212g to perform an on/off operation on its lighting load 214g. Lighting load 214g is located in area 201, which is isolated from all light sensors of control devices, including lighting control device 212g. As such, no light intensity change would be perceived by any sensor and no record data or light intensity would be recorded by the control processor 211. In step 738, the control processor 211 would determine that no data set was recorded. In step 740, the control processor 211 would create a record of the lighting control device 212g operating an isolated load 214g.

After the control processor 211 determines in step 748 that all lighting control devices have performed on/off operations and receives and records data sets, including light intensities, in step 750, the control processor 211 saves the light sensor record data and the process ends.

In another embodiment, in addition to performing light on/off operations, the building management system 210 performs shade raise/lower operations. FIG. 8A shows a signal flowchart 800 between the devices of the building management system 210 to acquire light sensor output level data from the light sensors of the various control devices 212a-o and any sensor devices 217 during the shade raise/lower operations. The control processor 211 sends a raise/lower command 802 one at a time to each shade control device—i.e., a control device that directly operates one or more shade devices. For example, control processor 211 sends a raise/lower command 802 to shade control 212c that operates two shade devices 214c (as shown in FIG. 2) and designates it as an operating shade control device.

The operating shade control device 212c performs a raise operation 804 by fully raising a first one of the shade devices 214c. Operating shade control device 212c then performs a light sensor reading operation 806 by reading its light sensor output level. In addition, all other wireless components of the building management system 210 having a light sensor, including control devices 212a-b, d-o and any sensor devices 217, perform light sensor reading operations 808 by reading their light sensor output levels. Operating control device 212c then performs a lower operation 810 by fully lowering the first one of the shade devices 214c. Again, the operating control device 212c and the other control devices 212a-b, d-o, as well as any sensor devices 217, perform light sensor reading operations 812 and 814, respectively, by reading their light sensor output levels. The operating control device 212c, and the other control devices 212a-b, d-o, as well as any sensor devices 217, report to the control processor 211 their read light sensor output levels 816 and 818 relative to the first one of the shade devices 214c. Shade control device 212c then repeats the raise/lower operation for the second one of the shade devices 214c in substantially the same manner as FIG. 8A. Additionally, the operation and communication illustrated in FIG. 8A is cycled through, one at a time, every pair of shade control device and its shade load(s) of the building management system 210. For example, control processor 211 next designates shade control device 212d as an operating shade control device to lower and raise, one at a time, shade devices 214d.

FIG. 8B provides details of the process 820 for collecting and recording additional light sensor data records during the shade raise/lower operations to be used to create the virtual floor plan of the present embodiments. Compared with lighting loads, changes in light intensities as a result of shade loads would be more accurately perceived during daylight. As such, in step 854, the control processor 211 needs to determine whether there is adequate daylight present before performing the shade raise/lower operation. To make this determination, the control processor 211 can receive time of day and weather information in step 852. Control processor 211 can receive this information through network 110 from server 111 (FIG. 1A) or directly from one or more Internet sources. If the control processor 211 determines in step 854 that the daylight is inadequate, in step 856 it postpones the raise/lower operation by a predetermined amount of time. In another embodiment, the control processor 211 further postpones the shade raise/lower operation until it determines that the house 200 is unoccupied—i.e., after not receiving any triggers from any occupancy sensors for a prolonged period of time.

After it is determined that enough daylight is present and the house is unoccupied, the control processor 211 moves to step 822 to command a shade control device to perform a shade raise/lower operation. Referring to FIG. 2, the control processor 211 first commands shade control device 212c to perform a shade raise/lower operation on shades 214c. The shade control device 212c performs a shade raise/lower operation per FIG. 8A.

After the shade raise/lower operation, the control processor 211 receives in step 824 light intensities from a control device having a light sensor before and after the raise/lower operation. The control processor 211 can first receive light intensities from shade control device 212c. In step 826, the received light intensity readings before and after the shade raise/lower operation are compared to perceive whether the light intensity has changed 828. For example, when shade control device 212c performs the raise/lower operation on shades 212c, both located in living area 204, its light sensor would perceive a change in the light intensity. Specifically, when the shades 212c are fully raised, the living area 204 would receive daylight through the windows associated with shades 212c. Living area 204 would become darker when the shades 212c are fully lowered. Accordingly, daylight is acting as a light source during the raise/lower operation. In step 834, a data set is recorded for the control device with changed light intensities. The data set can include one or more of the following: the UID of the operating control device (and by proxy identification of its load), UID of the control device from which the sensor data was received, and the determined change in light intensity. The change in light intensity is determined as a function of the change in the light intensities read by the light sensor of shade control device 212c before and after the raise/lower operation. Accordingly, any ambient reading is disregarded in the light intensity record. In one embodiment, the raise/lower operation is performed with all the light loads off for greater accuracy.

If there are additional control devices that report their sensor's read light intensities in step 836, the control processor 211 returns to step 824 and repeats the above comparison for each received data set and depending on the result either records 834 or discards 832 the data set. For example, control processor 211 records data sets for control device 212b, and discards data sets for control device 212a. Data sets can be discarded when the light intensity change falls below a predetermined threshold level. The light intensity threshold for discarding data sets received during the shade raise/lower operation can be lower than the threshold for discarding data sets received during the light on/off operation. During the raise/lower operation on shade devices 214c, data sets, including the light intensities, are also recorded for other control devices located in living area 204, including control devices 212b, 212d, 212e, 212f, and sensor device 217. All other data sets are discarded.

After all control devices and sensor devices report the light intensities of their light sensors, in step 838, the control processor 211 determines whether at least one data set was recorded. In this scenario, data sets were recorded for a plurality of control devices within living area 204. In step 842, the control processor 211 determines and records the approximate distances between the control devices and the windows, and by proxy shade devices 214c, within living area 204 based on the recorded light intensities. In step 844, the control processor 211 determines whether more than two data sets were recoded, and if so, groups and records these data sets as a group of data sets in step 846. For example, all data sets of light sensors of control devices and sensor device in living area 204 are grouped. In step 848, the control processor 211 determines whether there are more shade control devices that need to perform the raise/lower operation. If yes, the process returns to step 822. After the control processor 211 determines in step 848 that all shade control devices have performed raise/lower operations and receives and records data sets, including light intensities, in step 850, the control processor 211 saves the light sensor record data and the process ends.

FIG. 9 shows a lighting intensity distribution 900 exerted by the various lighting devices of the house 200 in proximity to the respective control devices and sensor devices having light sensors. The control devices and sensor devices that fall within the respective light distribution area, including any crossover areas, would record changes in light intensities as described above.

FIG. 10 provides details of the process 1000 for creating the virtual floor plan using the aforementioned mesh graph data and the sensor record data. Pairing this data, a very accurate floor plan of the installation area can be created. In step 1002, the mesh graph data is correlated with the light sensor record data to determine and plot the relative positioning of the controlled and controllable devices on a virtual floor plan. FIG. 11A shows a virtual floor plan plot 1100 illustrating the relative positioning of various devices of the building management system 210 with respect to each other. Relative positioning of control devices 212a-o and sensor device 217 with respect to each other are determined by the mesh graph data. Relative positioning of controllable devices 214a-n, such as lighting devices and shade devices, can then be plotted based on their respective distances to the control devices 212a-o and sensor device 217 recorded in the light sensor record data. In one embodiment, trilateration technique can be used to plot controllable devices 214a-n relative to the control devices 212a-o and sensor device 217. Greater number of control devices 214a-n within a room will result in greater accuracy. Isolated loads can be plotted in proximity to their respective control devices, but outside of the boundary of the relative positioning plot. For example, isolated lighting load 214g is plotted in proximity to its control device 212g, but outside of the outer boundary 1101 of the relative positioning plot 1100.

The distances recorded in the light sensor record data can be further used to correct the relative positioning of control devices 212a-o and sensor device 217 with respect to each other to more accurately represent the relative positioning plot 1100.

In step 1004, an outer wall 1101 is created as a rough or estimated outer boundary 1101 around the control devices and controllable devices with one or more recorded data sets. The outer wall 1101 is attached to any shade devices 214c and 214d. In one embodiment, outer wall 1101 is shaped as a rough rectangle, as in FIG. 11A. It will be apparent to one of ordinary skill in the art, that an installation area with more shade devices will give a more precise definition of the outer wall. Accordingly, the outer wall can comprise any shaped polygon.

In step 1005, the control processor compares all the recorded data set records to each other.

In step 1006, separate outer walls are created as rough boundaries around any recorded isolated loads. In other words, the recorded isolated loads are plotted and outlined outside of the outer boundary 1101. For example, a rectangular outer wall 1102 is created around isolated load 214g.

In step 1008, inner walls are added within outer wall 1101 to segregate or box-in any area with a single all-inclusive data set record. In other words, for each data set record comprising a control device that is not found in any of the remainder of the data set records, one or more inner walls are created to segregate that control device. Referring to FIG. 9, living area 202 contains a single light control device 212h and a single light load 214h that correspond to a single data set record. This area, and by proxy data set record, does not cross over with any other area. Referring to FIG. 11B, an inner wall 1104 is created to segregate living area 202. Similarly, area 206, with a single control device 212*l* and light load 214*l*, which would be recorded as a single data set record, would be boxed-in using inner walls 1106.

In step 1010, fully overlapping groups of data sets are identified and inner walls are created to segregate or box-in the control devices and sensor devices listed in the identified overlapping groups of data sets. In other words, the groups of data set records are compared, and groups with identical sets of control devices and sensor devices are boxed-in. For example, referring to FIG. 9, area 204 is isolated by walls or doors from the other areas 201-203 and 205-208. As such, the data sets for control devices 212*b-f*, and sensor device 217, would continuously be grouped together in steps 746 and 846 in FIGS. 7B and 8B into groups of data sets. In this example, there will be a total of five groups. First group relating to light load 214*b* operated by control device 212*b* with light sensor levels recorded by control devices 212*b-f* and sensor device 217. Second group relating to shade loads 214*c* operated by control device 212*c* with light sensor levels recorded by control devices 212*b-f* and sensor device 217. Third group relating to shade loads 214*d* operated by control device 212*d* with light sensor levels recorded by control devices 212*b-f* and sensor device 217. Fourth group relating to light loads 214*e* operated by control device 212*e* light sensor levels recorded by control devices 212*b-f* and sensor device 217. Finally, fifth group relating to light load 214*f* operated by control device 212*f* with light sensor levels recorded by control devices 212*b-f* and sensor device 217. In each of these groups, light intensities were recorded by identical control devices and sensor devices, namely: control devices 212*b-f* and sensor device 217. These devices and their respective controllable devices are therefore segregated or boxed-in with inner walls. In step 1010, inner walls 1108 are added to segregate or box-in control devices 212*b-f* and sensor device 217 and their respective loads.

In creating inner walls, it is assumed that each control device 212*a-o* is attached to a wall. In other words, wherever a control device exists, there must be a wall. In addition, walls are created between close control devices that have no overlapping data set records. For example, referring to FIG. 11B, an inner wall 1108 is created between and attached to control devices 212*a* and 212*b*. Inner wall 1104 is created between and attached to control device 212*h* and control devices 212*g* and 212*i*.

In step 1012, partially overlapping groups of data sets are identified, and partial inner walls are created to segregate control devices with no overlap in data sets. These walls are attached to one or more control devices 212*a-o*. Referring to FIG. 9, living areas 203, 205, 207, and 208 would have overlapping groups of data sets. For example, when light device 214*a* is turned on and off, a group of data sets is created grouping control devices 212*a*, 212*g*, and 212*i*. When light device 214*k* is turned on and off, a group of data sets is created grouping control devices 212*j*, 212*k*, 212*g*, and 212*i*. Data sets are overlapping for control devices 212*g* and 212*i*, while there is no overlap between control device 212*a* and control devices 212*j* and 212*k*. As such, referring to FIG. 11C, a partial inner wall 1110 is created to segregate control device 212*a* from control devices 212*j* and 212*k*.

Referring back to FIG. 9, when light device 214*k* is turned on and off, a group of data sets is created grouping control devices 212*j*, 212*k*, 212*g*, and 212*i*. When light device 214*m* is turned on and off, a group of data sets is created grouping control devices 212*g*, 212*i*, 212*m*, 212*o*, and 212*n*. Data sets are overlapping for control devices 212*g* and 212*i*. There is no overlap between control devices 212*j-k* and control devices 212*m-o*. As such, referring to FIG. 11C, partial inner wall 1112 is created to segregate control devices 212*j-k* from control devices 212*m-o*. Same process is repeated to create partial inner wall 1114.

In step 1014, the virtual floor plan can be further refined. For example, referring to FIG. 11C, areas of void 1121-1124 in proximity to the outer boundary wall 1101, where no control device 212*a-o* or controllable devices 214*a-n* are present can be identified and eliminated by tailoring the boundaries of outer wall 1101. FIG. 12A illustrates the refined virtual floor plan plot 1200 with the void areas 1121-1124 removed. The virtual floor plan can be further refined by factoring in the sunlight, time of day, and the weather, to locate windows and further refine outer walls, as shown in FIGS. 12B-12C. The virtual floor plan data can be improved over time as light intensity readings are recorded throughout the day, when users open and close doors and travel about the house. The resulting virtual floor plan 1300 is shown in FIG. 13.

In another embodiment, the control devices 212*a-o* and/or the sensor devices 217 of the building management system 210 can comprise other types of sensors to assist in creating the virtual floor plan of a building. For example, control devices 102*a-e* and sensor devices 107 can comprise one or more of light sensors, infrared sensors, photosensors, ultrasonic sensors, various motion sensors, occupancy sensors, proximity sensors, sound sensors, microphones, ambient temperature sensors, or the like.

Control devices 212*a-o* can use the occupancy sensor 106*a-e* (FIG. 1A) comprising an infrared sensor or an ultrasonic sensor to detect oppositely disposed walls and their distance with respect to the control devices 212*a-o*. An ultrasonic sensor emits a sound pulse that reflects off of objects and received back by the sensor. The longer the sound pulse travels, the greater the distance. As such ultrasonic sensors can be used to measure the distance between control devices 212*a-o* and walls. Similarly, an infrared sensor uses reflected light intensity to estimate the distance from an object. For example, referring to FIG. 2, control devices 212*c* can use an infrared or an ultrasonic sensor to measure its distance from oppositely disposed outer wall 225. Control processor 211 can cycle through each control device with an occupancy sensor 106*b-e* to detect their distances from walls. This data can be used to plot the virtual floor plan.

In other embodiments, control devices 212*a-o* and/or the sensor devices 217 of the building management system 210 can comprise microphones to locate AV devices, such as device 104*f* (FIG. 1), within a building. The control processor 101 can command an AV control device to operate a speaker of an AV device at a certain frequency. The microphones of the control devices 212*a-o* can be used to receive the sound signal exerted by the speaker. Distance can be calculated from the speaker to the microphone. These distances can be used to locate the AV devices with respect to the control devices 212*a-o* and sensor devices 217 and to plot the AV devices on the virtual floor plan.

The control processor 211 can use the resulting virtual floor plan 1300 shown in FIG. 13 to further configure the building management system 100 by creating room-by-room groupings of control devices 212*a-o*, sensor device 217, and controllable devices 214*a-n*. Using the virtual floor plan, the control processor 101 can identify living areas, or rooms, 201-208 and their respective control devices 212*a-o* and controllable devices 214*a-n*. For example, control processor 101 can identify living area 203 with control device 212*a* and lighting device 214*a*. Control processor 101 can also identify a separate living area 205 with control devices 212*g*, 212*i*, 212*j*, and 212*k*, and controllable devices 214*ij* and 214*k*.

In another embodiment, the control processor 211 can match duplicate control devices controlling the same load, such as master/slave switches, or 3-way switches. The control processor 211 can compare recorded groups of data sets to each other. When one group of data sets is identical to another group of data sets in all respects but with different operating control devices, the control processor 211 can match the control devices identified as the operating control devices for the recorded group of data sets as duplicate control devices controlling the same load. For example, control devices 212*i* and 212*j* are 3-way switches operating lighting load 214*ij*. When control device 212*i* performs an on/off operation, it is identified as an operating control device and its UID is sent to the control processor 211. Control device 212*i* turns on lighting load 214*ij*, resulting in data sets recorded and grouped for control devices 212*i*, 212*g*, 212*a*, 212*j*, 212*k*, 212*m*, and 212*o*. When control device 212*j* performs an on/off operation on lighting load 214*ij* and is identified as an operating control device, identical data sets are recorded and grouped for control devices 212*i*, 212*g*, 212*a*, 212*j*, 212*k*, 212*m*, and 212*o* with identical light intensities. Accordingly, control processor 211 can match and identify control devices 212*i* and 212*j* as operating the same lighting load 214*ij*.

The building management system 210 of the present embodiments is easily scalable. For add-on hardware, such as control devices, controllable devices, and/or sensor devices, the building management system 210 can integrate the hardware and map it to the virtual floor plan without doing a full system configuration. Since the building management system 210 already mapped out the existing system layout, it can easily locate the new hardware and its load and map it to the virtual floor plan. For example, a new control device can join the wireless network and identify itself to the control processor 211 as described in FIGS. 3A-3B. The control processor 211 can command the new control device to perform a signal strength reading of other control devices as described in FIGS. 5A-5B. Using this data, the new control device can be easily located within the house via trilateration. If the new control device operates a light load, then the control processor 211 can command the new control device to perform an on/off operation per FIGS. 7A-7B to locate the light load by receiving sensor record data from the various light sensor equipped devices of the building management system 210. Using the signal strength data and the sensor record data, the control processor 211 can map the new control device and its load on the virtual floor plan.

The virtual floor plan 1300 can be used for the automation of various devices of the building management system 210. This includes not only lighting but could also be applied to any environmental or monitoring devices, such as AV, HVAC, and security systems.

The virtual floor plan, and namely the room-by-room groupings of control and controllable devices, can be used for automatically setting up groupings of controllable devices to simultaneously controlling such devices. For example, the grouped lighting devices in a room can be all turned on or off, or they can be used to create lighting scenes. Similarly, all the shades in a room can be simultaneously raised or lowered. The virtual floor plan shown in FIG. 13, or room-by-room groupings of control and controllable devices, can be relayed to a user via a GUI of a computer, smartphone, or a control panel. By selecting a particular room on the user interface, the user can be presented with a narrowed down list of controllable devices for consumption.

FIG. 14 illustrates an exemplary user interface 1400 of the building management system 210. The various areas or rooms 201-208 of the house can be displayed for selection by the user. The user can control various controllable devices 214*a-n* room-by-room. For example, the user can designate area 204 as the kitchen. When the user selects kitchen 204, the user can control the lights 214*b*, 214*f*, and 214*e* located in the kitchen via tab 1401. The user can turn all the lights 214*b*, 214*g*, and 214*e* on or off, or control these lights individually. Similarly, the user can control shades 214*c* and 214*d* via shades tab 1402 in substantially same manner by choosing to raise or lower the shades. Further, the user can add, modify, or delete scenes via tab 1403.

Advantageously, the function of the aforementioned sensors used for creating the virtual floor plan, including the light sensor, ultrasonic sensor, microphones, or the like, is further harvested by the control processor 211 during the operation of the building management system 210. Once the virtual floor plan is created, it can be used to monitor and report the state of the space in a user friendly manner and to provide seamless control of the building management system 210 without manual control. The control processor 211 can utilize the various sensors of the control devices 212*a-o* and sensor devices 217 to perform various functions as described below.

The control processor 211 can comprise a light harvesting function using light sensors 105*a-f* (FIG. 1A) of the control devices 212*a-o* and any sensor devices 217 dispersed through the installation area 200. The light sensors of the building management system can monitor natural daylight from windows and signal the control processor 101 to raise or lower the lights and shades according to natural light fluctuations to compensate for the rising and setting of the sun. The control processor 211 can also monitor the shade state to determine light intensities. Daylight harvesting reduces energy usage while maintaining a consistent light level for a more efficient and comfortable work or living space. Occupancy sensors 106*a-e*, or any proximity sensors, of the control devices 202*a-o* and sensor devices 217 can be used to validate the light harvesting data. If there is an object in front of the light sensor 105*a-f* blocking the light, the occupancy sensor 106*a-e*, or a proximity sensor, will trigger and flag the light sensor reading invalid.

The control processor 211 can further comprise a proximity lighting function. Occupancy sensors 106*a-e* can be used to detect occupancy of users in a room. When the occupancy sensors 106*a-e* detect occupancy the lights could be switched on automatically. When the occupancy sensors 106*a-e* detect no occupants, the lights could be switched off automatically. The control processor 211 can also comprise a movement tracking function that uses the virtual floor plan and occupancy sensors 106*a-e* to detect individual user movement enabling the user to be tracked from room-to-room. As a result, accidental light or shade triggering can be prevented. For example, when two users are in a room and one user leaves, the lighting levels would not be altered because the control processor 211 would recognize that even though one user exited, the second user is still present.

Control processor 211 can include a predictive nightlight function that uses the virtual floor plan and sensor data for predictive nightlight. During late hours of the night, if the occupancy sensors 106*a-e*, or any proximity sensors, detect movement in a bedroom, the lights can be turned on very dimly so the user does not trip but also does not wake up other occupants.

Control processor 211 can also include an automatic gathering detection function. Control processor 211 can detect the presence of more than normal number of users in a room and can set a flag to ignore power saving utilities so that guests would not be disrupted.

In addition, the control processor 211 can include an automatic absence detection function. When the control processor 211 detects no users within house 200, a power saving mode can be enabled which would turn off all unnecessary lighting. When a prolonged absence is detected, lights could be automatically manipulated from memory to mimic occupancy.

The building management system 210 can further be utilized by security systems because it knows which rooms are adjoining and can monitor users moving between the rooms. Having a virtual floor plan of the installation area and various sensors in the control devices and sensor devices, the control processor 211 can keep a detailed map of room-by-room occupancy. The building management system 210 of the present embodiments will thus provide a unique security system with a virtual floor plan that registers all movement. The building management system 210 can effectively track the user's movement on the virtual floor plan as a means for predicting which rooms a user might enter next or what activity the user plans to do. The building management system 210 can be integrated with an IP camera to keep track of unfamiliar users and present that information through a series of alerts to the security system. The IP cameras can join the wireless network of the building management system 210 per FIGS. 3A-3B and can be located and mapped on the virtual floor plan per FIGS. 5A-5B. IP cameras can contain light sensors to accurately map them within a room. The control processor 211 can optimally operate the light in the same room as the IP camera so that the IP camera can always obtain an optimal image of user's movement, including throughout the night hours.

INDUSTRIAL APPLICABILITY

To solve the aforementioned problems, the aspects of the embodiments are directed towards a building management system that is automatically configured using a wireless mesh network data and sensor data to create a virtual floor plan.

The disclosed embodiments provide a system, software, and a method for configuring the building management system. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

Moreover, the process for configuring the building management system, discussed with reference to FIGS. 3A-12C, is not meant to limit the aspects of the embodiments, or to suggest that the aspects of the embodiments should be implemented following the configuration process. The purpose of the configuration process is to facilitate the understanding of one or more aspects of the embodiments and to provide the reader with one or many possible implementations of the process discussed herein. The steps performed during the configuration process are not intended to completely describe the process but only to illustrate some of the aspects discussed above. It should be understood by one of ordinary skill in the art that the steps may be performed in a different order and that some steps may be eliminated or substituted. Additionally, while some steps were discussed as being performed by a local control processor 101, 211, the steps may be performed by other components of the building management system 100 either locally or remotely. For example, some steps may be performed by the control devices 102a-e, 212a-o, sensor devices 107, 217, server 111, computer 114, and smartphone 116.

What is claimed is:

1. A building management system that is automatically configured, comprising:
    a plurality of lighting devices;
    a plurality of control devices comprising lighting control devices, each lighting control device directly controlling one or more of the lighting devices, wherein each control device comprises:
        a bidirectional wireless network interface enabling the control devices to intercommunicate with each other over a wireless network, and
        a light sensor detecting light intensity;
    a control processor in communication with the control devices comprising a memory encoding one or more processor-executable instructions, which when executed by the control processor, cause acts to be performed comprising:
        creating a mesh graph of relative positioning of the control devices to each other using received wireless signal strengths of the control devices relative to each other, cycling through and commanding each lighting control device to perform an on/off operation on one or more lighting device it directly controls, wherein for each on/off operation:
sending an on/off command to a lighting control device that directly controls one or more lighting device,
designating the lighting control device receiving the on/off command as an operating lighting control device,
receiving from each control device a pair light intensity readings comprising a first light intensity reading when the lighting device is turned on and a second light intensity reading when the lighting device is turned off,
for each pair of light intensity readings, comparing the first light intensity reading to the second light intensity reading to determine whether the light intensity has changed, and
recording a data set for each control device with changed light intensity readings;
determining relative positioning of the lighting devices to the control devices using the mesh graph and the recorded data sets, and
creating a virtual floor plan comprising the relative positioning of the control devices to each other and the relative positioning of the control devices to the lighting devices.

2. The building management system of claim 1, wherein the bidirectional wireless network interface comprises a bidirectional RF or IR transceiver.

3. The building management system of claim 1, wherein the control processor sends a command to each control device requesting it to read the received wireless signal strengths of other control devices.

4. The building management system of claim 1, wherein each control device transmits to the control processor configuration data comprising one or more of: a unique identification number, types of controllable devices it directly controls, number of controllable devices it directly controls, types of sensor outputs it has, type of user input it has, and any combinations thereof.

5. The building management system of claim 1, wherein the control processor determines distances between the control devices relative to each other using the received wireless signal strengths, and plots the determined distances on the virtual floor plan.

6. The building management system of claim 1, wherein the control processor determines distances between the control devices and the lighting devices based on the received light intensity readings, and plots the determined distances on the virtual floor plan.

7. The building management system of claim 6, wherein the distances are determined using an inverse square law of light formula.

8. The building management system of claim 1, wherein the control processor determines at least one of the relative positioning of the control devices to each other and the relative positioning of the control devices to the lighting devices using one or more of trilateration, triangulation, fingerprinting, and any combination thereof.

9. The building management system of claim 1, wherein the virtual floor plan comprises room-by-room groupings of the plurality of control devices and the lighting devices.

10. The building management system of claim 1, wherein in response to the on/off command, the operating lighting control device:
turns on a lighting device it directly controls,
turns off the lighting device it directly controls,
reads via its light sensor light intensities when the lighting device it directly controls is turned on and when the lighting device it directly controls is turned off, and
transmits the recorded light intensity readings to the control processor.

11. The building management system of claim 1, wherein each data set comprises: a unique identification number of the operating lighting control device, a unique identification number of a control device with changed light intensity reading, and a determined change in light intensity.

12. The building management system of claim 1, wherein one of the control processor and the operating lighting control device prompts the remaining control devices to perform light sensor reading operations during each on/off operation and to report their light intensity readings to the control processor.

13. The building management system of claim 1, wherein the control processor identifies duplicate lighting control devices controlling same lighting device by:
for each on/off operation, determining whether at least two data sets were recorded, and if so, grouping the at least two data sets into a group of data sets;
comparing the groups of data sets to each other to identify fully overlapping groups of data sets having identical lighting control devices with identical changed light intensity readings;
identifying and recording operating control devices of the fully overlapping groups of data sets as duplicate control devices controlling the same lighting device.

14. The building management system of claim 1, wherein data sets are discarded for light intensity readings with no perceived light intensity change or for a change in light intensity reading that falls below a predetermined threshold value.

15. The building management system of claim 1, wherein in creating the virtual floor plan, the one or more processor-executable instructions, when executed by the control processor, cause acts to be performed comprising:
creating an outer boundary wall around a combination of control devices with one or more recorded data sets;
creating one or more inner walls between close control devices that have no overlapping data sets, wherein the one or more inner walls are attached to one or more of the plurality of control devices.

16. The building management system of claim 15, wherein in creating the inner walls, the one or more processor-executable instructions, when executed by the control processor, cause acts to be performed comprising:
comparing the data sets to each other;
creating one or more inner walls to segregate any control device of a data set that is not found in any of a remainder of the data sets.

17. The building management system of claim 15, wherein in creating the inner walls, the one or more processor-executable instructions, when executed by the control processor, cause acts to be performed comprising
for each on/off operation, determining whether at least two data sets were recorded, and if so, grouping the at least two data sets into a group of data sets;
comparing the groups of data sets to each other to (i) identify fully overlapping groups of data sets with identical control devices, and to (ii) identify partially overlapping groups of data sets with partially overlapping control devices;

creating one or more inner walls to segregate a combination of control devices of the fully overlapping groups of data sets from a remainder of control devices; and creating one or more partial inner walls to segregate from each other control devices that do not overlap in the partially overlapping groups of data set records.

18. The building management system of claim 15, wherein the outer boundary wall is refined by eliminating areas of void in proximity to the outer boundary wall where no control devices or lighting devices are present.

19. The building management system of claim 15, wherein for each on/off operation, the processor determines whether at least one data set was recorded, and if no data set was recorded, the control processor creates a record of a lighting control device operating an isolated lighting device.

20. The building management system of claim 19, wherein each isolated lighting device is plotted on the virtual floor plan in proximity to a lighting control device that controls the isolated lighting device.

21. The building management system of claim 20, wherein a separate outer boundary wall is created around the plotted isolated lighting device and outside of the outer boundary wall.

22. The building management system of claim 1 further comprising:
a plurality of shade devices;
wherein the control devices comprise shade control devices, each directly controlling one or more of the shade devices;
wherein one or more processor-executable instructions, when executed by the control processor, further cause acts to be performed comprising:
determining relative positioning of the shade device to the control devices using the mesh graph and received light intensity readings obtained by the light sensors of the control devices when each shade device was raised and lowered, and
plotting the relative positioning of the shade device to the control devices onto the virtual floor plan.

23. The building management system of claim 22, wherein the one or more processor-executable instructions, when executed by the control processor, further cause acts to be performed comprising:
cycling through and commanding each shade control device to perform a raise/lower operation on one or more shade device it directly controls, and
receiving from each control device light intensity readings obtained by its light sensor during each raise/lower operation, and recording a data set for each control device with changed light intensity readings.

24. The building management system of claim 23, wherein for each raise/lower operation, the one or more processor-executable instructions, when executed by the control processor, cause acts to be performed comprising:
sending a raise/lower command to a shade control device that directly controls a shade device;
designating the shade control device receiving the raise/lower command as an operating shade control device;
receiving from each control device a pair light intensity readings comprising a first light intensity reading when the shade device is fully raised and a second light intensity reading when the shade device is fully lowered;

for each pair of light intensity readings, comparing the first light intensity reading to the second light intensity reading to determine whether the light intensity has changed.

25. The building management system of claim 1, wherein each control device further comprises one or more of a proximity sensor, a sound sensor, a microphone, an ambient temperature sensor, or any combinations thereof.

26. The building management system of claim 1, wherein each control device further comprises a sensor that detects a distance to an oppositely disposed wall, and wherein the processor plots the oppositely disposed wall onto the virtual floor plan based on the distance.

27. The building management system of claim 1, wherein each control device further comprises a sound sensor that detects a distance to a speaker based on a sound emitted from the speaker, and wherein the processor plots the speaker onto the virtual floor plan based on the distance.

28. The building management system of claim 1, wherein the light sensor comprises one or more of a photosensor, a photocell, an open-loop daylight sensing photocell, a closed-loop ambient light sensing photocell, or any combination thereof.

29. The building management system of claim 1, wherein each control device further comprises an occupancy sensor that detects an occupancy state of a room.

30. The building management system of claim 29, wherein the occupancy sensor comprise at least one of an infrared sensor, an ultrasonic sensor, and any combinations thereof.

31. A building management system that is automatically configured, comprising:
a plurality of lighting devices;
a plurality of control devices comprising lighting control devices, each lighting control device directly controlling one or more of the lighting devices, wherein each control device comprises:
a bidirectional wireless network interface enabling the control devices to intercommunicate with each other over a wireless network, and
a light sensor detecting light intensity;
a control processor in communication with the control devices comprising a memory encoding one or more processor-executable instructions, which when executed by the control processor, cause acts to be performed comprising:
receiving wireless signal strengths of the control devices relative to each other,
creating a mesh graph of relative positioning of the control devices to each other using the received wireless signal strengths,
cycling through and commanding each lighting control device to perform an on/off operation on one or more lighting device it directly controls,
receiving from each control device light intensity readings obtained by its light sensor during each on/off operation, and recording a data set for each control device with changed light intensity readings,
determining relative positioning of the control devices to the lighting devices using the mesh graph and the recorded data sets, and
creating a virtual floor plan comprising the relative positioning of the control devices to each other and the relative positioning of the control devices to the lighting devices, wherein in creating the virtual floor plan:

creating an outer boundary wall around a combination of control devices with one or more recorded data sets, and creating one or more inner walls between close control devices that have no overlapping data sets, wherein the one or more inner walls are attached to one or more of the plurality of control devices.

32. A method for automatically configuring a building management system, the building management system comprising (i) a plurality of lighting devices, and (ii) a plurality of control devices comprising lighting control devices each directly controlling one or more of the lighting devices, the method comprising:

receiving wireless signal strengths of a plurality of control devices relative to each other obtained by bidirectional wireless network interfaces of the control devices that enable the control devices to intercommunicate with each other over a wireless network;

creating a mesh graph of relative positioning of the control devices to each other using the received wireless signal strengths of the control devices relative to each other;

cycling through and commanding each lighting control device to perform an on/off operation on one or more lighting device it directly controls, wherein for each on/off operation:

sending an on/off command to a lighting control device that directly controls one or more lighting device, designating the lighting control device receiving the on/off command as an operating lighting control device, receiving from each control device a pair light intensity readings comprising a first light intensity reading when the lighting device is turned on and a second light intensity reading when the lighting device is turned off, for each pair of light intensity readings, comparing the first light intensity reading to the second light intensity reading to determine whether the light intensity has changed, and recording a data set for each control device with changed light intensity readings;

determining relative positioning of the lighting devices to the control devices using the mesh graph and the recorded data sets; and creating a virtual floor plan comprising the relative positioning of the control devices to each other and the relative positioning of the control devices to the lighting devices.

* * * * *